(12) United States Patent
Figotin et al.

(10) Patent No.: US 8,655,134 B2
(45) Date of Patent: Feb. 18, 2014

(54) PHOTONIC DEVICES HAVING DEGENERATE OR SPLIT SPECTRAL BAND EDGES AND METHODS FOR USING THE SAME

(75) Inventors: Aleksandr Figotin, Irvine, CA (US); Ilya M. Vitebskiy, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/294,132

(22) Filed: Nov. 10, 2011

(65) Prior Publication Data

US 2012/0057819 A1    Mar. 8, 2012

Related U.S. Application Data

(63) Continuation of application No. 12/131,897, filed on Jun. 2, 2008, now abandoned, and a continuation-in-part of application No. 13/019,121, filed on Feb. 1, 2011, which is a continuation of application No. 11/720,592, filed on May 31, 2007, now Pat. No. 7,881,570.

(60) Provisional application No. 60/941,055, filed on May 31, 2007.

(51) Int. Cl.
   *G02B 6/10*     (2006.01)
   *G02B 6/26*     (2006.01)
   *G02B 6/42*     (2006.01)

(52) U.S. Cl.
   USPC ............................................. 385/131; 385/28

(58) Field of Classification Search
   USPC .................................................. 385/28, 131
   See application file for complete search history.

(56) References Cited

U.S. PATENT DOCUMENTS

| | | |
|---|---|---|
| 5,365,541 A | 11/1994 | Bullock |
| 5,559,825 A | 9/1996 | Scalora et al. |
| 5,689,275 A | 11/1997 | Moore et al. |
| 5,751,466 A | 5/1998 | Dowling et al. |
| 5,999,308 A | 12/1999 | Nelson et al. |
| 6,130,780 A | 10/2000 | Joannopoulos et al. |
| 6,134,043 A | 10/2000 | Johnson et al. |
| 6,358,854 B1 | 3/2002 | Fleming et al. |
| 6,414,780 B1 | 7/2002 | D'Aguanno et al. |

(Continued)

OTHER PUBLICATIONS

M.G. Krein et al., "Four Papers on Ordinary Differential Equations", American Mathematical Society Translations, Providence, R.I., Series 2, vol. 120, pp. 1-70 (1983).

(Continued)

*Primary Examiner* — Ryan Lepisto
*Assistant Examiner* — Robert Tavlykaev
(74) *Attorney, Agent, or Firm* — Kenneth S. Roberts; One LLP

(57) ABSTRACT

Provided herein are photonic devices configured to display photonic band gap structure with a degenerate or a split band edge. Electromagnetic radiation incident upon these photonic devices can be converted into a frozen mode characterized by a significantly increased amplitude, as compared to that of the incident wave. The device can also be configured as a resonance cavity with a giant transmission band edge resonance. In an exemplary embodiment, the photonic device is a periodic layered structure with each unit cell comprising at least two anisotropic layers with misaligned anisotropy. The degenerate or split band edge at a given frequency can be achieved by proper choice of the layers' thicknesses and the misalignment angle. In another embodiment, the photonic device is configured as a waveguide periodically modulated along its axis.

30 Claims, 24 Drawing Sheets a) Regular band edge (RBE)

b) Degenerate band edge (DBE)

(56) References Cited

U.S. PATENT DOCUMENTS

| | | | |
|---|---|---|---|
| 6,701,048 | B2 | 3/2004 | Figotin et al. |
| 6,823,111 | B2 | 11/2004 | Jette et al. |
| 6,825,982 | B1 | 11/2004 | Ting |
| 7,072,555 | B1 | 7/2006 | Figotin et al. |
| 2001/0019565 | A1 | 9/2001 | Iwasaki et al. |
| 2002/0018298 | A1 | 2/2002 | Miller et al. |
| 2002/0064343 | A1 | 5/2002 | Ukechi |
| 2002/0162988 | A1 | 11/2002 | Figotin et al. |
| 2004/0008928 | A1 | 1/2004 | Gerken et al. |
| 2004/0013361 | A1 | 1/2004 | Chen et al. |
| 2004/0218651 | A1 | 11/2004 | Iwasaki et al. |
| 2009/0315634 | A1 | 12/2009 | Sertel et al. |

OTHER PUBLICATIONS

A. Figotin et al., "Electromagnetic Unidirectionality in Magnetic Photonic Crystals", Physical Review E 67, vol. 67, 165210 (2003), pp. 1-20.

A. Figotin et al., "Nonreciprocal Magnetic Photonic Crystals", Physical Review E., vol. 63, 066609 (2001), pp. 1-17.

I. Abdulhalim, "Analytical propagation matrix method for anisotropic magneto-optic layered media", J. Opt. A: Pure Appl. Opt. 2 (2000) pp. 557-564.

I. Abdulhalim, "Analytic propagation matrix media for linear optics of arbitrary biaxial layered media", Journal of Optics A: Pure and Applied Optics, vol. 1, No. 5, pp. 646-653, 1999.

Dwight W. Berreman, "Optics in Strati led and Anisotropic Media: 4 X 4-Matrix Formulation", Journal of the Optical Society of America, vol. 62, No. 4 (Apr. 1972), pp. 502-510.

A. Figotin et al., "Oblique Frozen Moses in Periodic Layered Media", Physical Review E 68, 036609 (2003), pp. 1-16.

J. Ballato et al., "Frozen light in periodic stacks of anisotropic layers", Physical Review E71, (2005).

A. Figotin and I. Vitebskiy, "Gigantic transmission band-edge resonance in periodic stacks of anisotropic layers", Physical Review E72, 036619, (2005).

A. Figotin and V. Gorentsveig, "Localized electromagnetic waves in a layered periodic dielectric medium with a defect", Physical Review B 58, 180 (Jul. 1998).

A. Vinogradov et al., "Surface state peculiarities in one-dimensional photonic crystal interfaces", Physical Review B 74, 045128 (2006).

M. Scalora et al., "Ultrashot pulse propagation at the photonic band edge: Large tunable group delay with minimal distortion and loss", Physical Review E 54, No. 2, R1078 (Aug. 1996).

M. Bloemer et al., "Transit time of optical pulses propagating through a finite length medium", Physical Review E 65, 056615 (.002).

M. Soijacic et al., "Photonic-crystal slow-light enhancement of nonlinear phase sensitivity", J. Opt. Soc. Am. B 19, 2052 (Sep. 2002).

M. Notomi, "Photonic Crystals: Towards Ultrasmall Lightwave Circuits", NTT Technical Review, vol. 2, No. 2, pp. 36-47, 2004.

A. Figotin, and I. Vitebskiy, "Slow-wave resonance in periodic stacks of antisotropic layers", Physical Review A, vol. 76, 05389, pp. 1-12 (2007).

S. Yarga et al., "Degenerate band edge crystals and periodic assemblies for antenna gain enhancement", IEEE (2006), pp. 408-411.

A. Figotin and I. Vitebskiy, "Electromagnetic unidirectionally and frozen modes in magetic photonic crystals", J. Magn Magn. Mater. 300 (2006., pp. 117-121.

A. Figotin and I. Vitebskiy, "Slow Light in Photonic Crystals, Waves in Random and Complex Media", vol. 16, No. 3, pp. 293-382, Aug. 2006.

A. Figotin and I. Vitebskiy, "Frozen light in photonic crystals with degenerate band edge", Physical Review E 74, 066613 (2006).

M. Selim Unlu and S. Strite, "Resonant cavity enhanced photonic devices", J. Appl. Phys. 78(2) (1995).

J. Dowling et al., "The photonic band edge laser: A new approach enhancement", J. Appl. Phys. 75 (Feb. 1994), pp. 1896-1899.

J. Poon et al., "Designing coupled-resonator optical waveguide delay lines", J. Opt. Soc. Am. B 21, No. 9 (Sep. 2004), pp. 1665-1673.

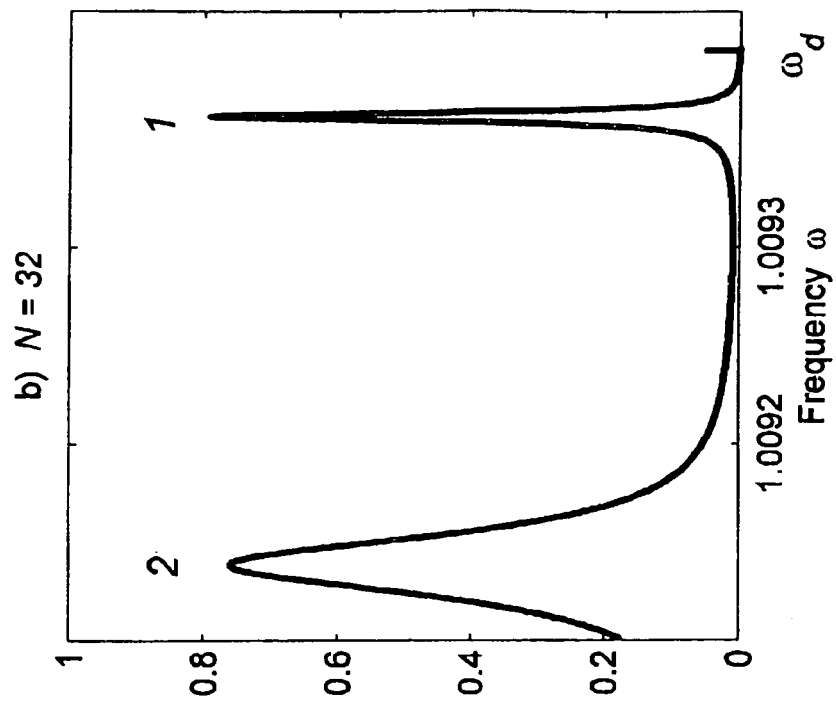
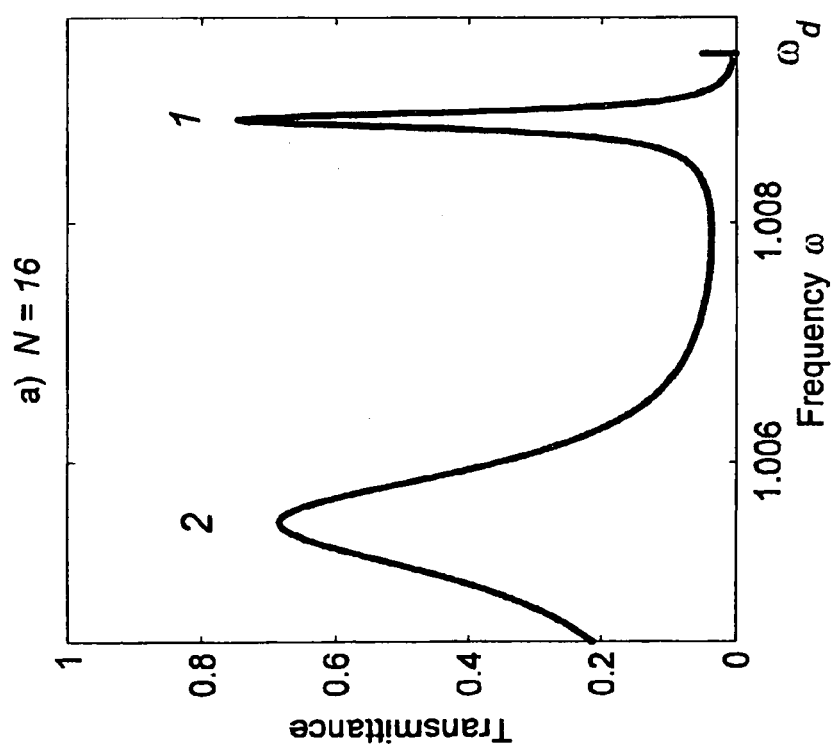
Fig. 8

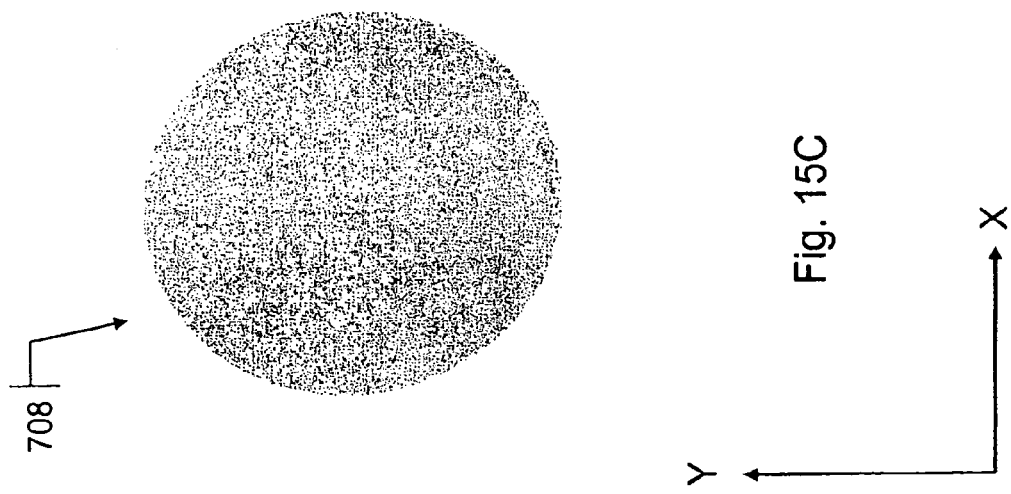
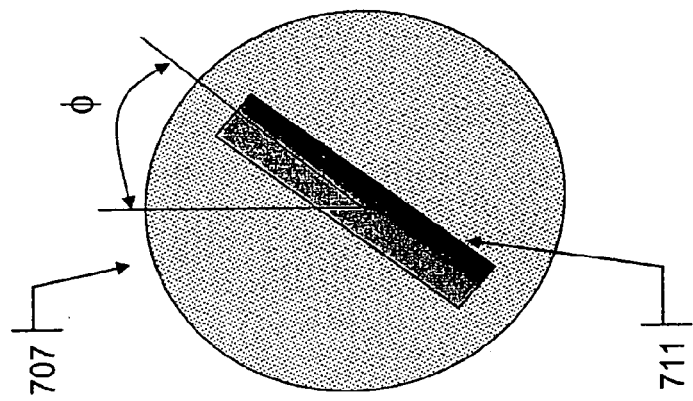
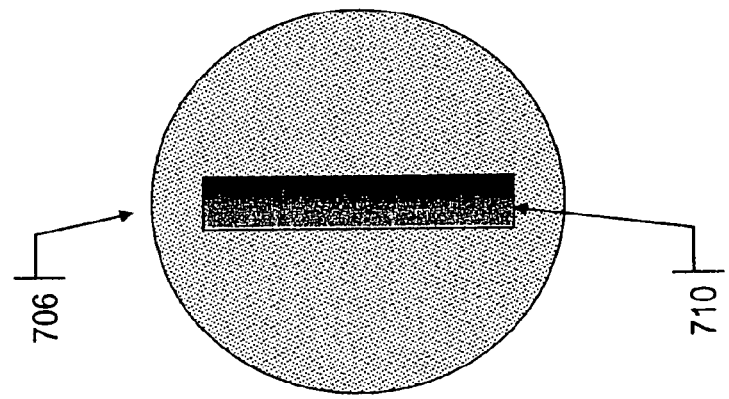
Fig. 15C
Fig. 15B
Fig. 15A

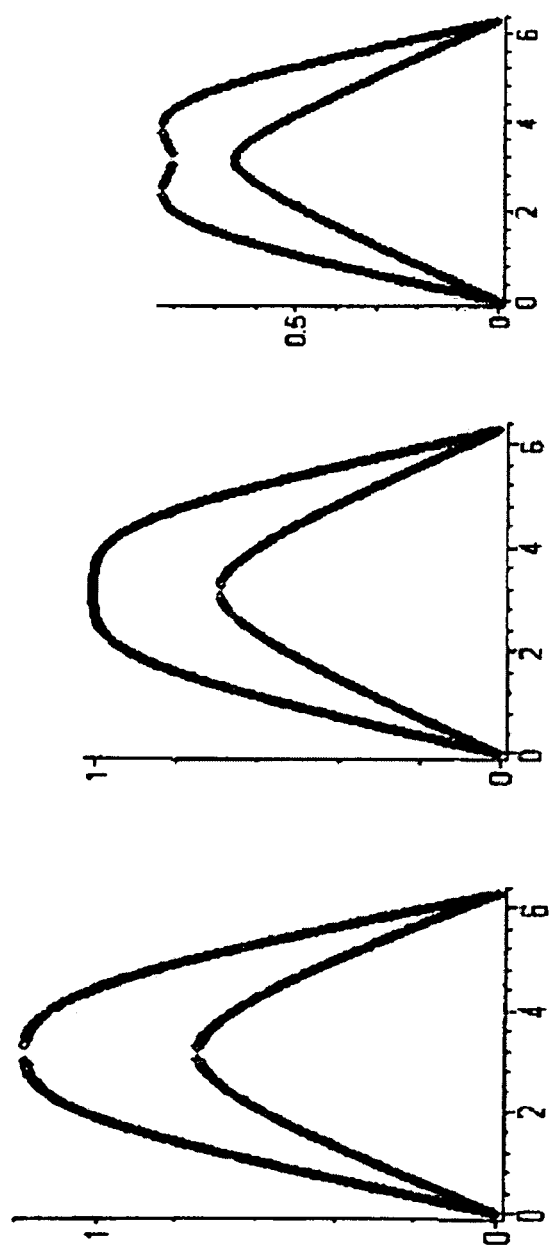
FIG. 16(a) a) Regular band edge (RBE)
FIG. 16(b) b) Degenerate band edge (DBE)
FIG. 16(c) c) Split band edge (SBE)

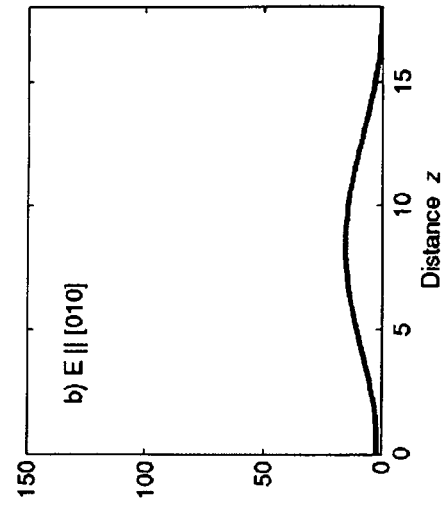
FIG. 21(a)
FIG. 21(b)
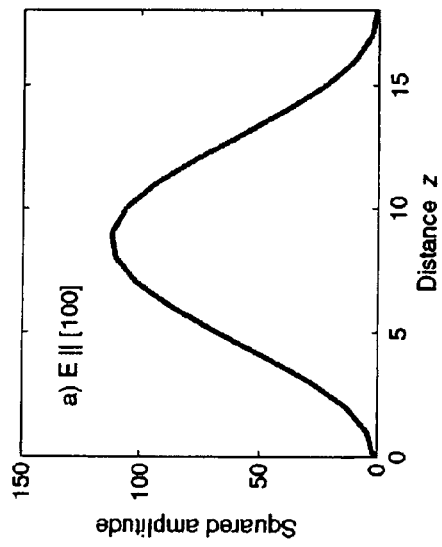
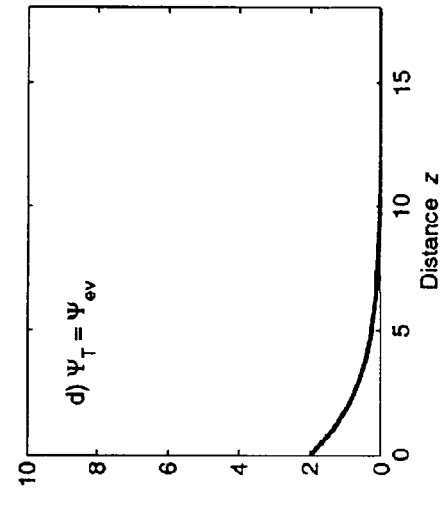
FIG. 21(c)
FIG. 21(d)
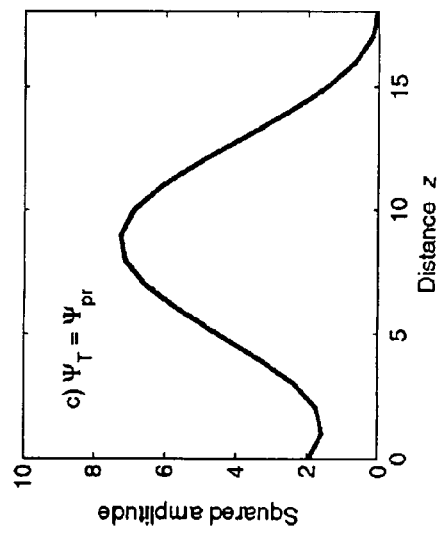

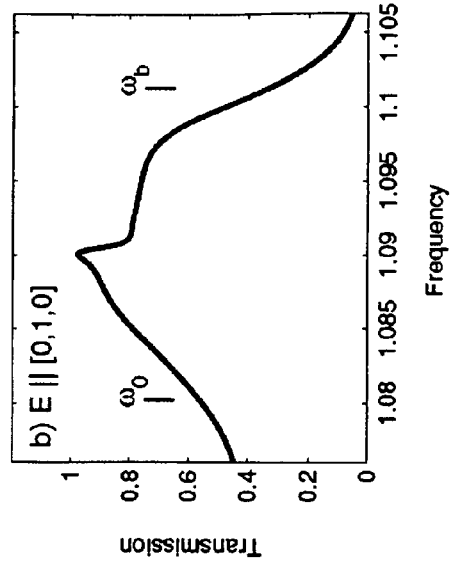
FIG. 23(b)
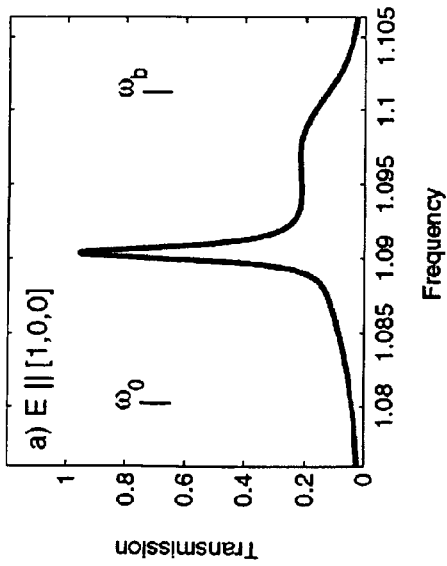
FIG. 23(a)
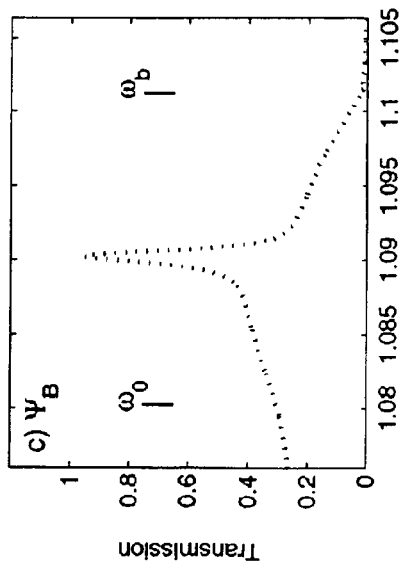
FIG. 23(d)
FIG. 23(c)

PHOTONIC DEVICES HAVING DEGENERATE OR SPLIT SPECTRAL BAND EDGES AND METHODS FOR USING THE SAME

RELATED APPLICATION

This application is a continuation of U.S. application Ser. No. 12/131,897 filed Jun. 2, 2008, now abandoned which claims the benefit of U.S. Provisional application Ser. No. 60/941,055 filed May 31, 2007, and is a continuation-in-part of U.S. application Ser. No. 13/019,121 filed Feb. 1, 2011, which is a continuation of U.S. application Ser. No. 11/720,592 filed May 31, 2007, now U.S. Pat. No. 7,881,570, which claims the benefit of U.S. Provisional Application Ser. No. 60/648,319 filed Jan. 28, 2005, the specification of which applications are incorporated herein by reference.

This invention was made with Government support under grant number F49620-01-1-0567, awarded by Air Force Office of Scientific Research, Air Force Materials Command, USAF. The Government has certain rights to this invention.

FIELD OF THE INVENTION

The invention relates generally to the field of photonic devices, and more particularly to systems and methods for transmitting and storing electromagnetic radiation in a photonic device with inhomogeneous spatially periodic structure.

BACKGROUND INFORMATION

The manipulation of electromagnetic energy can be advantageous to numerous applications within many industries. For instance, much effort has been focused on reducing the velocity of electromagnetic energy, such as light and microwave pulses. The reduced velocity of electromagnetic energy can facilitate manipulation of electromagnetic waves. It can also enhance the light-matter interaction essential in numerous optical and microwave applications. One approach to reducing the electromagnetic energy velocity is through the use of spatially inhomogeneous periodic media displaying strong spatial dispersion at operational frequencies. Spatial inhomogeneity results in strong nonlinear relation between the frequency $\omega$ of propagating electromagnetic wave and the respective Bloch wave number k. The relation $\omega(k)$ is referred to as dispersion relation or, equivalently, as k–$\omega$ diagram. At certain frequencies, the wave group velocity $v=d\omega/dk$ vanishes implying extremely low energy velocity.

One common photonic device exploiting spatial inhomogeneity is a photonic crystal. This device is typically composed of multiple repeating segments (unit cells) arranged in a periodic manner. Electromagnetic frequency spectrum of a typical photonic crystal develops frequency bands separated by forbidden frequency gaps. The frequency separating a photonic band from adjacent photonic gap is referred to as a (photonic) band edge, or simply a band edge. At frequencies close to a photonic band edge, the relationship between the frequency $\omega$ and the wave number k can be approximated as $$'\omega-\omega_g \propto (k-k_g)^2, \quad (1)$$

implying that the respective group velocity $$v=d\omega/dk \propto k-k_g \propto \sqrt{\omega-\omega_g} \quad (2)$$

vanishes as $\omega$ approaches the band edge frequency $\omega_g$. This creates conditions for very slow pulse propagation. Another common photonic device exploiting spatial inhomogeneity and providing conditions for slow energy propagation is a periodic array of weakly coupled resonators. There exist many different physical realizations of the individual resonators connected into the periodic chain.

One common drawback of current photonic devices employing spatial inhomogeneity is that only a small fraction of the incident electromagnetic radiation is converted into the slow electromagnetic mode, resulting in low efficiency of the device. Another common drawback of current photonic devices is the necessity to employ a large number of the said segments (unit cells) in order to achieve a desirable slowdown of electromagnetic energy. Accordingly, improved photonic devices are needed having smaller dimensions and allowing for more efficient manipulation of the incident electromagnetic radiation.

SUMMARY

The devices, systems and methods described in this section are done so by way of exemplary embodiments that are not intended to limit these devices, systems and methods in any way.

In one exemplary embodiment, a photonic system is provided that includes a photonic device configured to display a degenerate band edge, the photonic device including a first end, a second end, a first surface located on the first end and a plurality of segments coupled together between the first and second ends. Each segment can include a first anisotropic layer, a second anisotropic layer misaligned with the first anisotropic layer, and a third layer. The photonic device can be configured to convert an electromagnetic wave incident on the first surface into a frozen mode, where the electromagnetic wave operates at a frequency in proximity with the degenerate band edge.

In another exemplary embodiment, a photonic system is provided that includes a photonic device configured to display a degenerate band edge, the photonic device including a first end, a second end, a first surface located on the first end and a plurality of periodic segments coupled together between the first and second ends. Each segment can include a first anisotropic layer having a first thickness and a second anisotropic layer misaligned with the first anisotropic layer and having a second thickness different from the first thickness. The photonic device can be configured to convert an electromagnetic wave incident on the first surface into a frozen mode, when the electromagnetic wave operates at a frequency in proximity with the degenerate band edge.

In another exemplary embodiment, a photonic system is provided that includes a photonic device configured to display a split band edge, the photonic device including a first end, a second end, a first surface located on the first end and a plurality of segments coupled together between the first and second ends. Each segment can include a first anisotropic layer, a second anisotropic layer misaligned with the first anisotropic layer, and a third layer. The photonic device can be configured to convert an electromagnetic wave incident on the first surface into a frozen mode, where the electromagnetic wave operates at a frequency in proximity with the split band edge.

In another exemplary embodiment, a photonic system is provided that includes a photonic device configured to display a split band edge, the photonic device including a first end, a second end, a first surface located on the first end and a plurality of periodic segments coupled together between the first and second ends. Each segment can include a first anisotropic layer having a first thickness and a second anisotropic layer misaligned with the first anisotropic layer and having a second thickness different from the first thickness. The photonic device can be configured to convert an electromagnetic wave incident on the first surface into a frozen mode, when the electromagnetic wave operates at a frequency in proximity with the split band edge.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention not be limited to the details of the example embodiments.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIGS. 8-9 are graphs depicting performance of an exemplary embodiment of the photonic device in the regime of giant transmission band edge resonance.

FIGS. 10-15C are block diagrams depicting additional exemplary embodiments of a photonic device displaying degenerate photonic band edge.

FIGS. 16(a)-(c) are graphs depicting the dispersion relations of periodic layered structures involving birefringent layers. FIGS. 16(a)-(c) correspond to a regular band edge (RBE), a degenerate band edge (DBE), and a split band edge (SBE), respectively.

FIGS. 21(a)-(d) are graphs depicting the smoothed energy distribution W(z) at the frequency of the first (closest to DBE) giant transmission band edge resonance in FIG. 20 for four different polarizations of the incident wave. In a single mode excitation regime of FIGS. 21(c) and (d), the transmission resonance is suppressed. Particularly so in the case of (d), where the EM field inside the periodic medium corresponds to a single evanescent mode. The distance is expressed in units of L.

FIGS. 23(a)-(d) are graphs depicting the manifestation of SBE related double resonance in the transmission dispersion t(ω) of periodic stack with N=18. The respective k–ω diagram is shown in FIG. 19(b). Observe that at the resonance frequency, the stack transmittance is close to unity regardless of the incident wave polarization. By contrast, in the case of DBE-related giant transmission resonance in FIG. 20, the impedance matching is polarization dependent. In the cases of FIG. 23(c) and (d), the incident wave polarization is adjusted so that at any given frequency it would excite a single propagating Bloch mode ($\psi_A$ or $\psi_B$) in the respective semi-infinite layered structure. The frequency (bis expressed in units of $cL^{-1}$.

DETAILED DESCRIPTION

Photonic devices and systems having degenerate or split spectral band edges and methods for using the same are described herein. These devices, systems and methods are based on the physical idea of using spatially periodic structures displaying a degenerate band edge $$\omega - \omega_d \propto (k - k_d)^4, \quad (3)$$

rather then the regular band edge described by equation (1). Unlike the regular band edge (1), display of the degenerate band edge (3) allows for the frozen mode regime, accompanied by a complete conversion of the incident radiation into a slow mode with a drastically enhanced amplitude. In addition, a resonance cavity incorporating a photonic device displaying a degenerate band edge can have much smaller relative dimensions compared to those incorporating existing photonic devices.

Light transmitting periodic structures that can be configured to display the degenerate band edge (3) include, but are not limited to: (i) photonic crystals, such as periodic layered structures, as well as structures with two and three dimensional periodicity, (ii) spatially modulated optical and microwave waveguides and fibers, and (iii) arrays of coupled resonators. The embodiments discussed below are directed towards periodic arrays of anisotropic dielectric layers; however, it is important to emphasize that the underlying reason for the enhanced performance of the photonic device as described herein lies in the existence of a degenerate band edge (3) in the respective frequency spectrum. Specific physical realization of the periodic structure displaying such a spectrum is determined by practical needs, i.e., one of ordinary skill in the art will readily recognize how to implement spatially modulated optical and microwave waveguides and fibers, arrays Of coupled resonators and other desired structural configurations based on the embodiments described herein.

Figure 1:
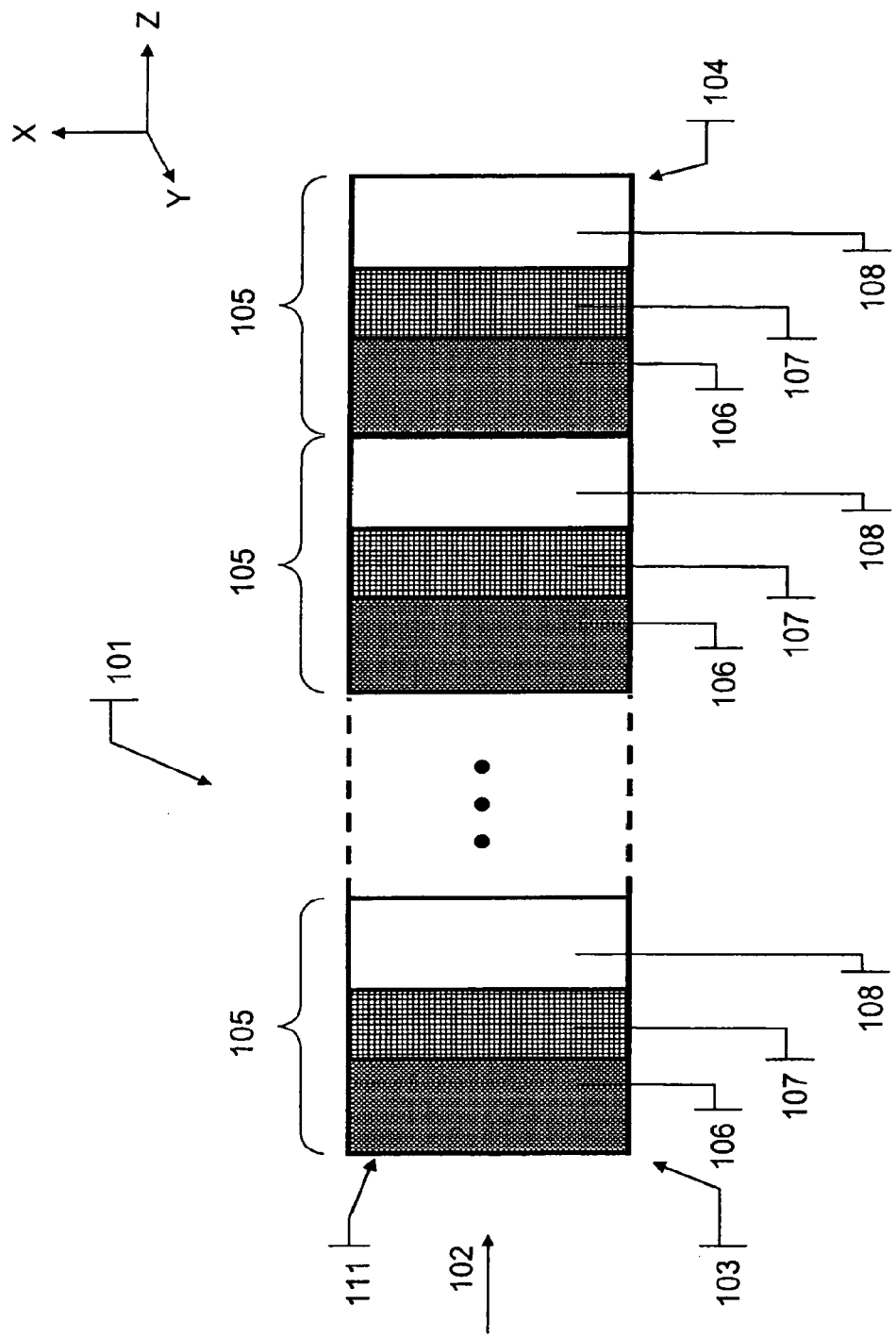
FIGS. 1-2 are block diagrams depicting exemplary embodiments of a photonic device.

FIG. 1 is a block diagram depicting one exemplary embodiment of a photonic device 101 configured to display a degenerate spectral band edge (3). FIG. 1 depicts an electromagnetic wave 102 incident a surface 111 of device 101. In this embodiment, photonic device 101 includes a plurality of segments (unit cells) 105 coupled together between a first end 103 and a second end 104 of the device 101. Each segment 105 can include a first anisotropic layer 106, a second anisotropic layer 107, and a third optional layer 108. The third layer 108 can be made of either isotropic or anisotropic material, or it can be omitted entirely. The Z direction is normal to layers 106-108. The thickness of segment 105 in the Z direction is preferably of the same order of magnitude as the wavelength of the incident wave 102. Each of the three layers 106-108 has a plane-parallel configuration with a uniform thickness (measured in the Z direction) and composition, although these conditions may not be necessary. The thickness of each of layers 106-108 can be different from each other in accordance with the needs of the application.

In this embodiment, the structure of photonic device 101 is periodic along the Z direction perpendicular to layers 106-108, which are parallel to the X-Y plane. The X, Y and Z directions are perpendicular to each other like that of a standard Cartesian coordinate system. Photonic device 101 is also preferably homogeneous in the in-plane directions X and Y, although photonic device 101 can also be inhomogeneous in the directions X, Y, or both, if desired. The total number N of repeating segments 105 in photonic device 101 depends on the specific application and usually varies between three and several hundred, although device 101 is not limited to this range of segments 105.

The anisotropy axes of anisotropic layers 106 and 107 preferably have misaligned orientation in the X-Y plane with the misalignment angle φ being different from 0 and π/2. In this embodiment, anisotropic layers 106 and 107 are composed of the same anisotropic dielectric material and have a variable misalignment angle. The dielectric permittivity tensors of the three constitutive layers 106, 107 and 108 can be chosen as follows:

$$\varepsilon_{A1} = \begin{bmatrix} \varepsilon + \delta & 0 & 0 \\ 0 & \varepsilon - \delta & 0 \\ 0 & 0 & \varepsilon_{zz} \end{bmatrix}, \quad (6)$$

$$\varepsilon_{A2} = \begin{bmatrix} \varepsilon + \delta\cos2\varphi & \delta\sin2\varphi & 0 \\ \delta\sin2\varphi & \varepsilon - \delta\cos2\varphi & 0 \\ 0 & 0 & \varepsilon_{zz} \end{bmatrix}, \quad \varepsilon_B = \begin{bmatrix} 1 & 0 & 0 \\ 0 & 1 & 0 \\ 0 & 0 & 1 \end{bmatrix},$$

where $\varepsilon_{A1}$, $\varepsilon_{A2}$ and $\varepsilon_B$, are the dielectric permittivity tensors for the layers 106, 107 and 108, respectively. The choice (6) for the material tensor $\varepsilon_B$ corresponds to the case where layer 108 is an empty gap between the adjacent pairs of anisotropic layers 106 and 107. If desired, optional layer 108 can also be filled with either anisotropic or isotropic material, such as glass, air, active or nonlinear medium, etc., or it can be left vacant (e.g., as a vacuum), depending on the specific practical needs of the application. The quantity δ in (6) describes inplane anisotropy of the A-layers 106 and 107, essential for the existence of degenerate band edge. The parameter φ in (6) designates the misalignment angle between anisotropic layers 106 and 107. It can be chosen anywhere between 0 and π, which provides additional tunability of the photonic device. The k-ω diagram of the photonic device in FIG. 1 can develop degenerate band edge (3) only if the misalignment angle φ is other than 0 and π/2. A typical value for the misalignment angle φ is π/4. If desired, the tensor anisotropy (6) of layers 106 and 107 can be replaced with similar shape anisotropy of the respective X-Y cross sections, i.e., anisotropy can be induced with only isotropic materials through the shape or configuration of the X-Y cross section of the respective layers (e.g., the X-Y cross section is shaped as a, rectangle, ellipse or the like). Additional exemplary embodiments with modulated X-Y cross-sections are described with respect to FIGS. 10-13.

Figure 2:
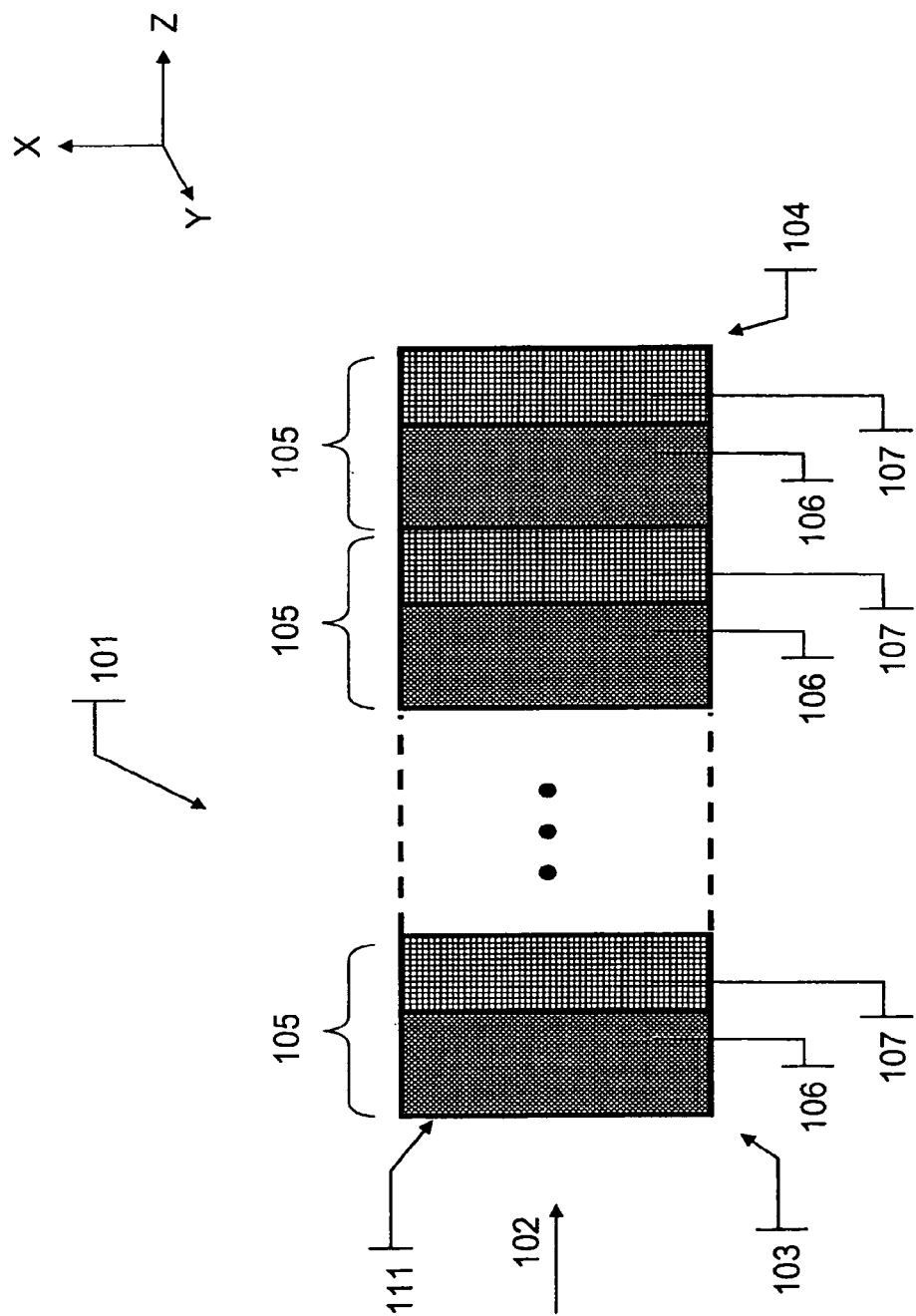
Figure 3:
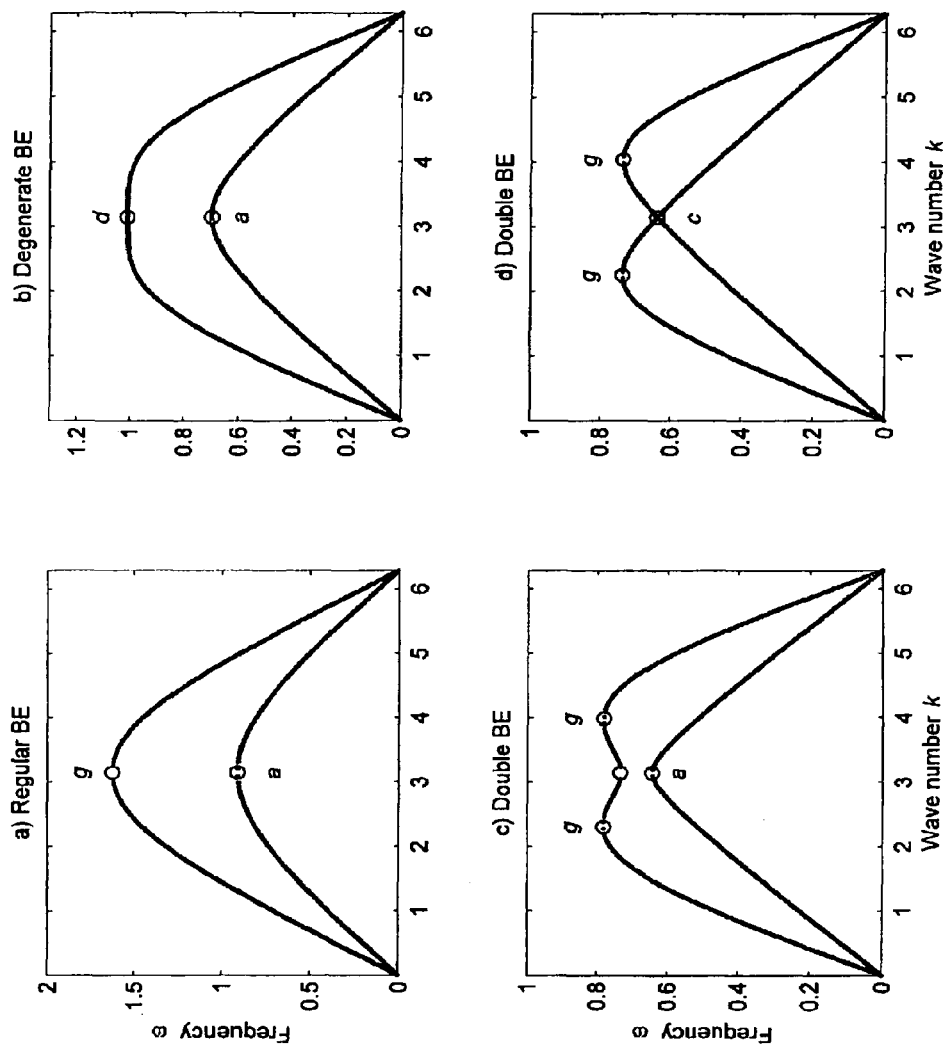
FIGS. 3A-D are graphs depicting exemplary k–ω diagrams of embodiments of the photonic device described with respect to FIG. 1 corresponding to different geometrical parameters of the photonic device.

FIG. 2 is a block diagram depicting another exemplary embodiment of photonic device 101 configured to display the degenerate band edge. This embodiment is similar to the embodiment described with respect to FIG. 1 except each layer 108 is omitted. In this case, anisotropic layers 106 and 107 preferably have different thicknesses and/or different permittivity tensors $$\varepsilon_{A1} = \begin{bmatrix} \varepsilon_1 + \delta_1 & 0 & 0 \\ 0 & \varepsilon_1 - \delta_1 & 0 \\ 0 & 0 & \varepsilon_{1zz} \end{bmatrix}, \quad (7)$$

$$\varepsilon_{A2} = \begin{bmatrix} \varepsilon_2 + \delta_2\cos2\varphi & \delta_2\sin2\varphi & 0 \\ \delta_2\sin2\varphi & \varepsilon_2 - \delta_2\cos2\varphi & 0 \\ 0 & 0 & \varepsilon_{2zz} \end{bmatrix}.$$

Otherwise, the characteristics of this embodiment in FIG. 2 would be very similar to that of the embodiment described with respect to FIG. 1.

FIGS. 3A-D are graphs depicting the k–ω diagram for the embodiment of photonic device 101 described with respect to FIG. 1 for four different values of the thickness of the B layer 108, respectively. In the graph depicted in FIG. 3B, the upper dispersion curve develops degenerate band edge d described in (3) and associated with the frozen mode regime. (In FIG. 3B, the frequencies above band edge d can be referred to as the frequency gap or photonic gap, while frequencies below band edge d can be referred to as the frequency band or photonic band.) The embodiment of photonic device 101 described with respect to FIG. 1 can develop degenerate band edge d, provided that the misalignment angle φ between the adjacent anisotropic layers 106 and 107 is different from 0 and π/2. If the physical parameters, such as the layer thicknesses and/or the misalignment angle φ, of photonic device 101 deviate from those corresponding to the situation depicted in FIG. 3B, the degenerate band edge d turns into a regular band edge g described in (1) and depicted in FIGS. 3A, 3C and 3D. The k–ω diagram depicted in FIG. 3D corresponds to the case where the B layers 108 are absent.

Figure 4:
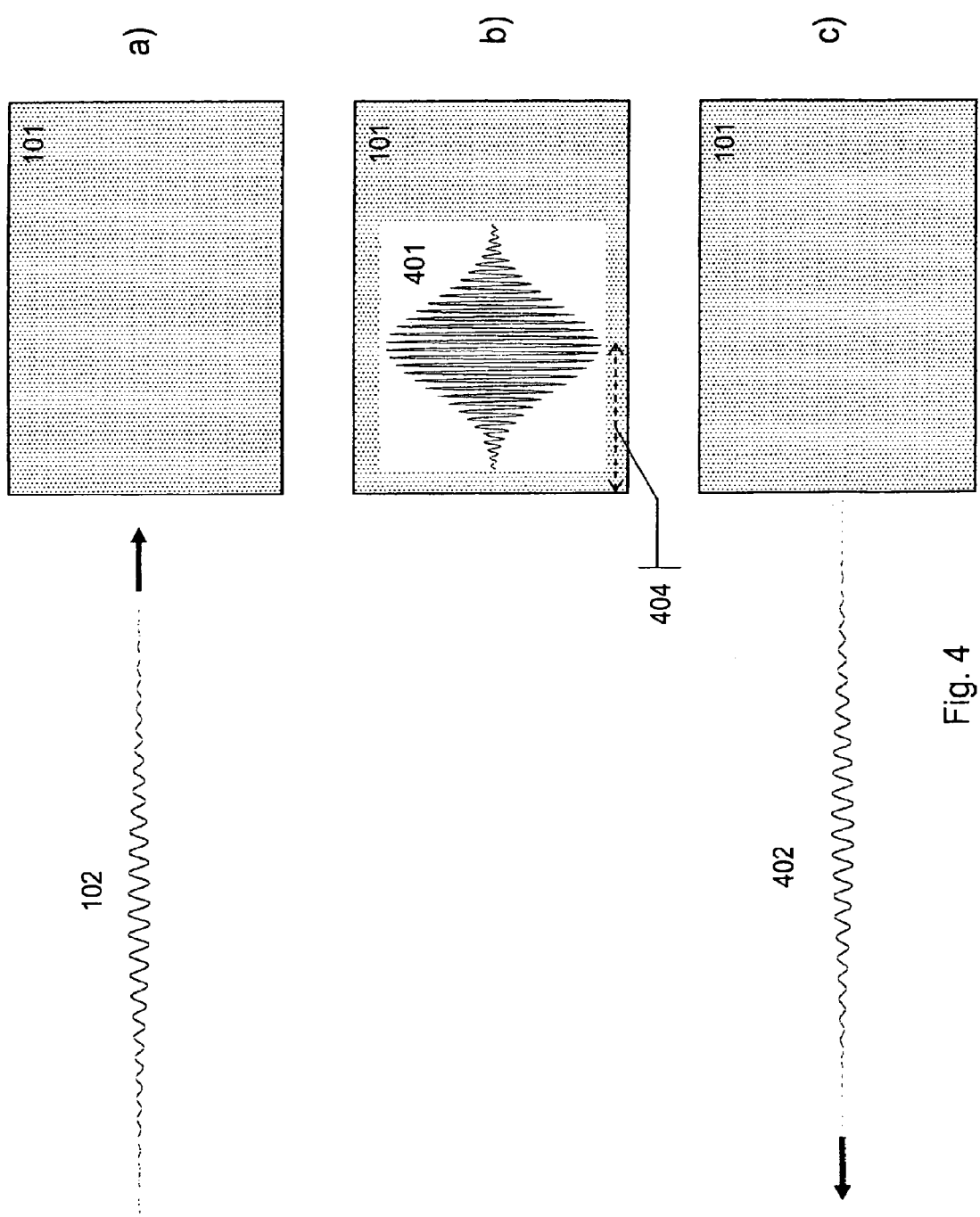
FIGS. 4A-C are block diagrams depicting performance of an exemplary embodiment of the photonic device in the frozen mode regime at frequencies close to the degenerate band edge.

FIGS. 4A-C are schematic diagrams depicting a photonic device 101 during three stages of the frozen mode regime. Photonic device 101 shown here is configured similar to that of the photonic device embodiment described with respect to FIG. 1. Here, the frozen mode regime occurs for an incident electromagnetic pulse 102 with a central frequency close to that of the degenerate band edge d depicted in FIG. 3B. FIG. 4A depicts incident pulse 102 propagating towards the surface 111 of photonic device 101. FIG. 4B depicts the situation after pulse 102 has reached surface 111 and has been transmitted into device 101 and converted into the frozen mode pulse 401. Here, the frozen mode 401 is characterized by an enhanced pulse amplitude and compressed pulse length, compared to those of the incident pulse 102. FIG. 4C depicts the situation after the frozen pulse 401 exits the photonic device 101 and turns into a reflected wave 402. The distance 404 through which the frozen mode pulse 102 is transmitted inside photonic device 101, as well the degree of amplitude enhancement, are strongly dependent on the pulse bandwidth and the central frequency. The frozen mode amplitude will typically increase with decreasing bandwidth and lesser difference between the central frequency and the degenerate band edge.

Figure 5:
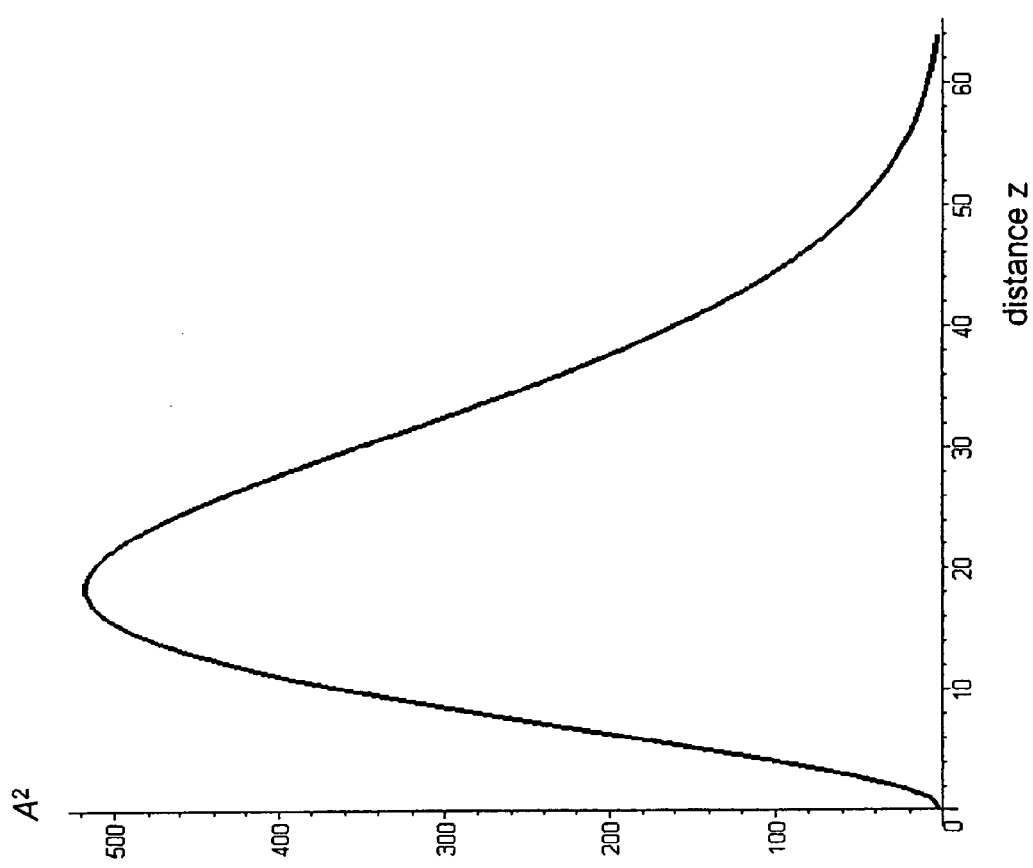
FIG. 5 is a graph depicting an exemplary frozen mode profile at steady-state regime.

FIG. 5 is a graph depicting an exemplary smoothed frozen mode profile at the steady-state frozen mode regime. In this example, the amplitude of the incident wave is unity. The point z=0 coincides with surface 111.

Figure 6:
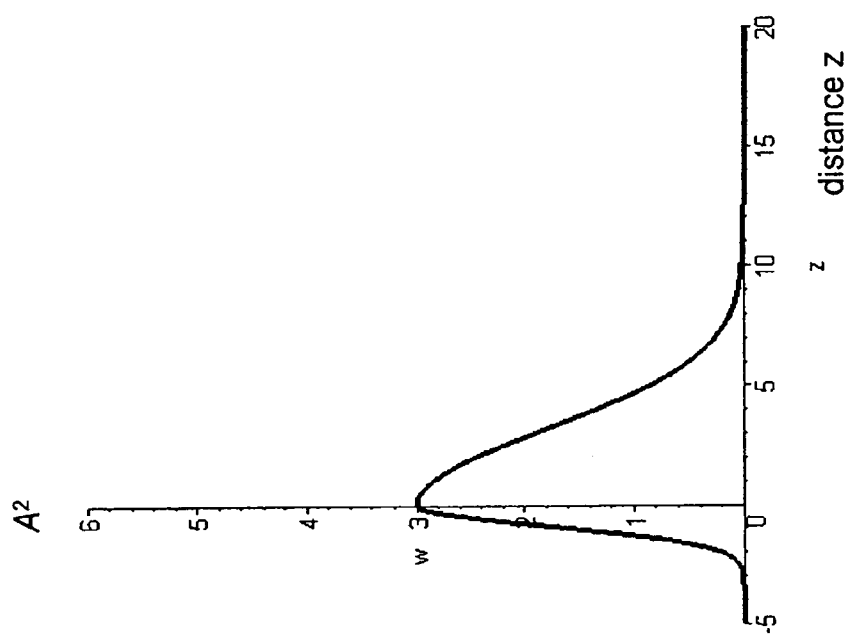
FIG. 6 is a graph depicting the profile of a typical electromagnetic surface wave at the air/photonic crystal interface of a photonic device.

FIG. 6 is a graph depicting a smoothed profile of a typical surface electromagnetic wave. Here, the field amplitude decays exponentially with the distance z from surface 111.

Figure 7:
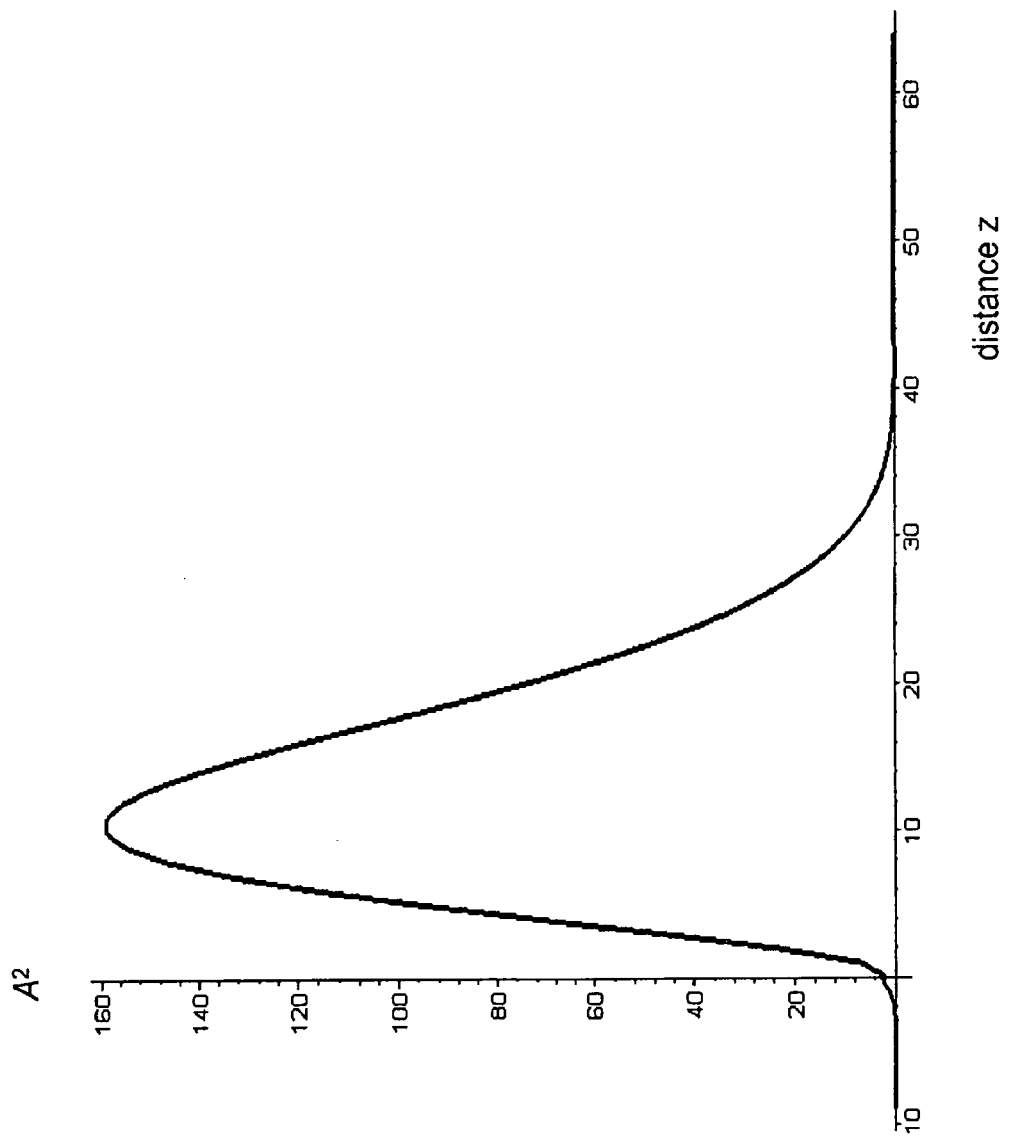
FIG. 7 is a graph depicting an exemplary profile of an abnormal surface wave at a frequency close to that of the degenerate band edge in an exemplary embodiment of the photonic device.

FIG. 7 is a graph depicting a smoothed profile of an exemplary abnormal surface wave associated with the degenerate band edge (3) of the electromagnetic spectrum. In this example, the field amplitude sharply rises inside photonic device 101, before decaying as the distance z from surface 111 further increases. The magnitude and the location of the field amplitude maximum sharply depend on the wave frequency. Remarkably, the maximal amplitude of an abnormal surface wave can be reached at a significant distance from surface 111. The latter circumstance can suppress the energy leakage outside photonic device 101.

FIG. 8 is a graph depicting a typical transmission dispersion of photonic device 101 with the k–ω diagram depicted in FIG. 3B. Here, N=16 (in FIG. 8A) and N=32 (in FIG. 8B) is the total number of segments 105 in device 101 and $\omega_d$ is the degenerate band edge frequency. The sharp peaks in the device transmittance correspond to giant cavity resonances, their exact position being dependent on the number N.

Figure 9:
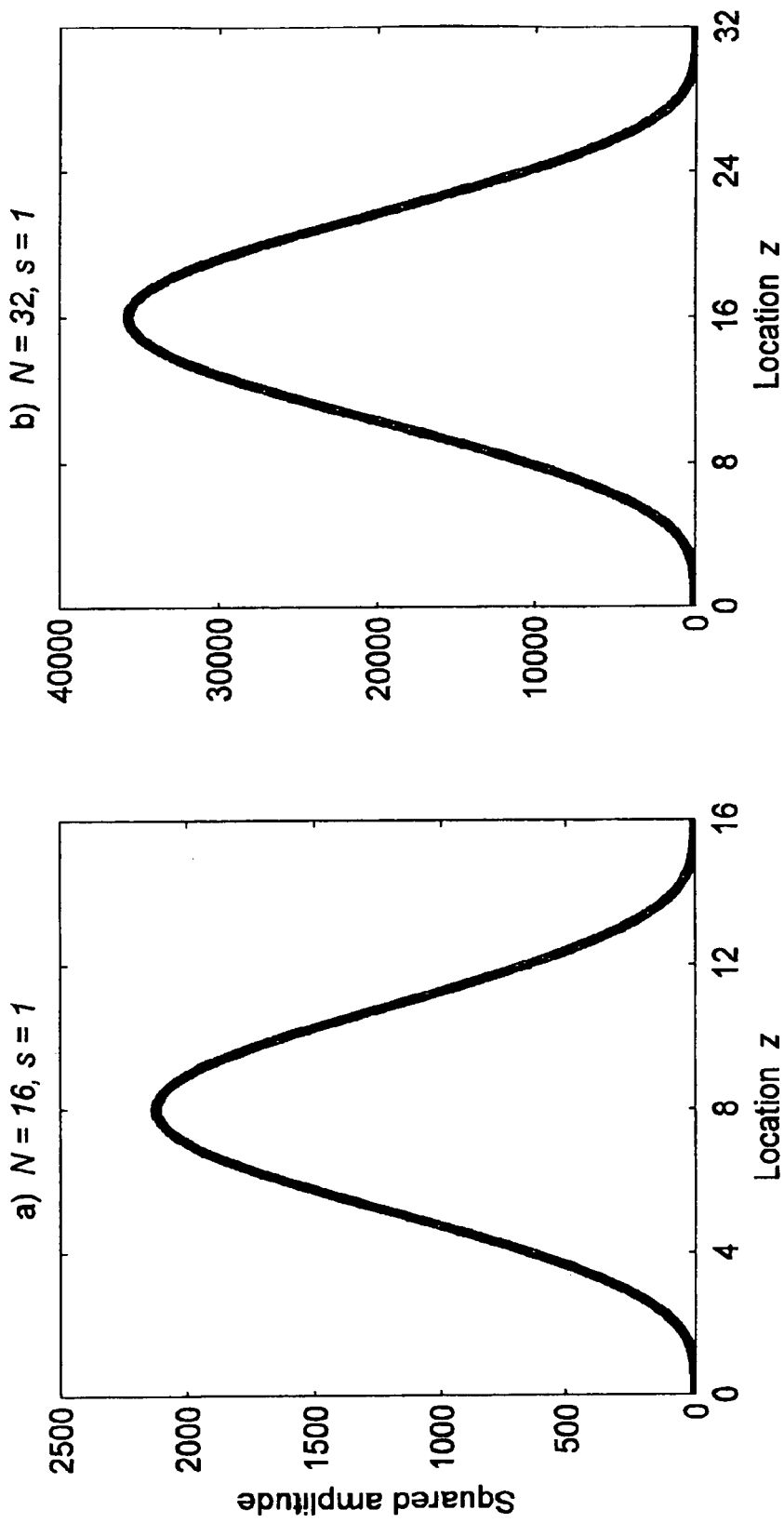

FIG. 9 is a graph depicting the smoothed field distribution $A^2(z)$ in photonic device 101 at the frequency of the rightmost giant transmission resonance closest to the degenerate band edge frequency $\omega_d$ depicted in FIG. 8, N=16 (in FIG. 9A) and N=32 (in FIG. 9B). The amplitude of the incident plane wave is unity, implying that the field enhancement in the case N=16 reaches 2000, while in the case N=32, the filed enhancement reaches 35000. To achieve similar performance in a common periodic array of isotropic layers, one would generally need at least several hundred layers in a stack.

Figure 10:
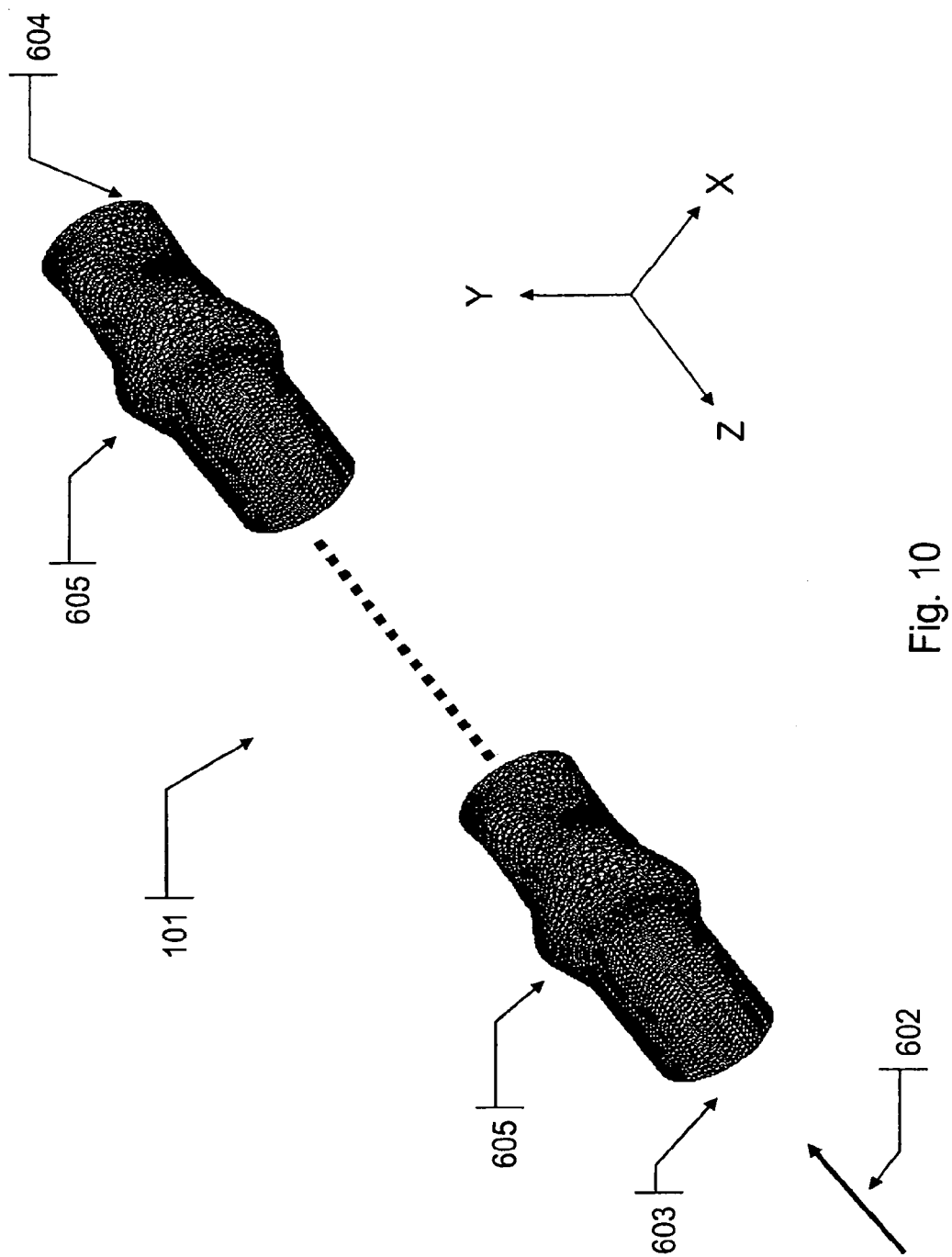
Figure 11:
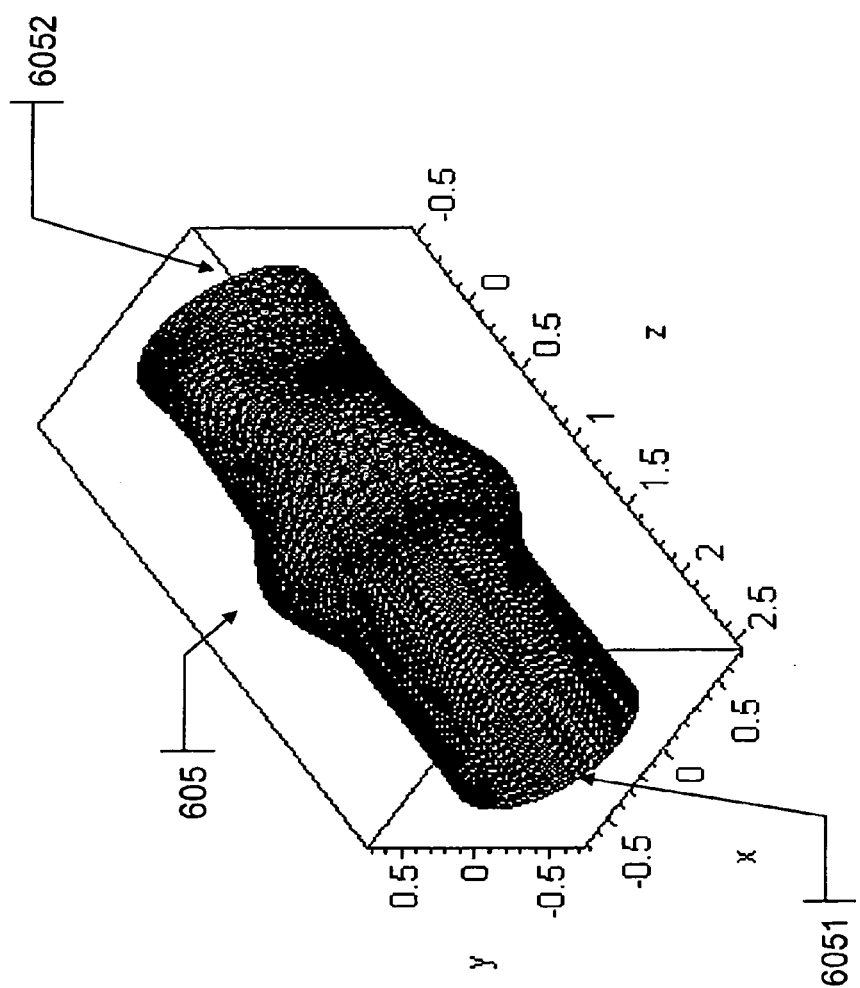

FIG. 10 is a block diagram depicting another exemplary embodiment of photonic device 101. Here, device 101 is a spatially periodic structure configured to display an electromagnetic k–ω diagram with a degenerate band edge (3). In this embodiment, device 101 is configured as a waveguide with an X-Y cross-section periodically modulated along the waveguide axis Z. In this embodiment, waveguide 101 includes a plurality of segments (unit cells) 605 coupled together between a first end 603 and a second end 604 of waveguide 101. Only the rightmost and the leftmost segments 605 are shown in FIG. 10. Each segment 605 has a variable cross-section depending on the coordinate Z, as shown in FIG. 11. The end cross-sections 6051 and 6052 are identical, to ensure smooth connection of adjacent segments 605 in the waveguide. At least at some Z, the X-Y cross-section of segment 605 is anisotropic in the X-Y plane. The term "anisotropic in the X-Y plane" implies that the axis Z of the waveguide is not an n-fold symmetry axis of this particular cross-section with n>2. The length of each segment 605 in the Z direction depends on operational frequency and is of the order of the respective electromagnetic wavelength.

Figure 12:
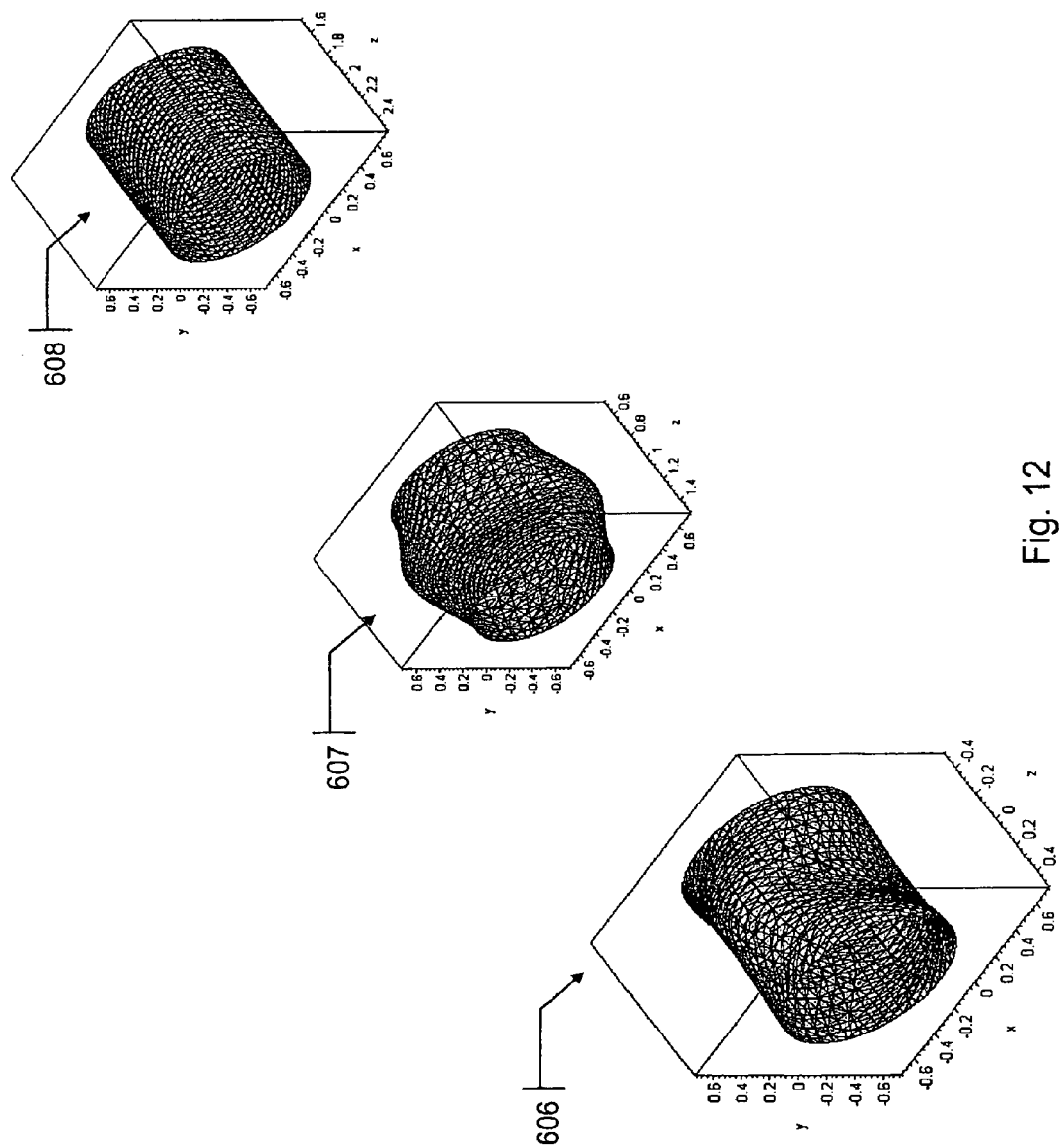
Figure 13:
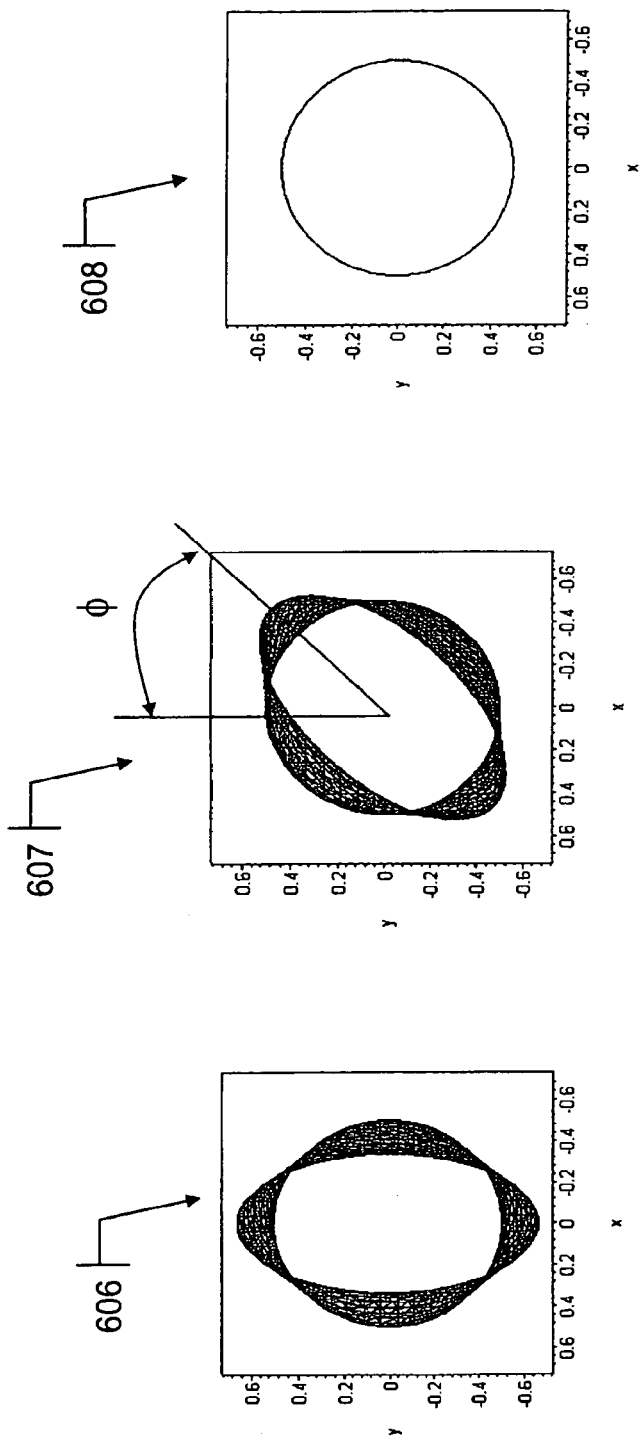

In one exemplary embodiment, each segment 605 can be subdivided into three adjacent portions 606-608, as depicted in FIG. 12 (portions 606-608 are shown here spaced apart from each other, although this would not be the case in the actual implementation). Portion 606 can be viewed as a circular section of the waveguide squeezed in the Y direction, so that its cross-section in the middle has an elliptical shape, as seen in FIGS. 12 and 13A. Portion 607 in FIGS. 12 and 13B can be similar to portion 606, but rotated about the Z axis by an angle φ, preferably different from 0 and π/2. In the embodiments depicted in FIGS. 10-13C, the misalignment angle φ is chosen π/4, although it is not limited to such. A third, optional portion 608, depicted in FIGS. 12 and 13C, can have circular, or any other cross-section, or it can be omitted altogether. The cross-sections at both ends of each of the three portions 606-608 are identical to ensure their smooth interface in the waveguide. In this example, the end cross-section is circular, although any desired shape can be used. One can view the shape anisotropy of portions 606, 607, shown in FIGS. 12 and 13A-B, as being analogous to the dielectric anisotropy (6) of the respective layers 106, 107 of the embodiment of the periodic layered structure 101 described with respect to FIG.

1. Portion 608 with a circular cross-section could be viewed as analogous to isotropic layer 108 in FIG. 1.

Again, waveguide 101 as depicted in FIG. 10 can be configured to display a degenerate band edge at desired frequency. By way of example, display of the degenerate band edge can be done as follows: (i) by adjusting the variable X-Y cross-section as a function of the axial coordinate Z, or (ii) by the proper choice of dielectric or other low-absorption materials filling the waveguide. It should be noted that waveguide 101 can display the electromagnetic band gap structure with a degenerate band edge in any manner and is not limited to just these two examples.

The input electromagnetic wave 602 enters waveguide 101 in FIG. 10 at end 603, similar to the embodiments described with respect to FIGS. 1-2. The optimal number of segments 605 in the device 601 can vary between three and several hundred or more, depending on the specific application.

If this embodiment of waveguide 101 is empty, or if it is filled with a uniform dielectric substance, the misaligned cross-section anisotropy of portions 606 and 607 may become required for the existence of degenerate band edge. But if the filling material is not distributed uniformly, as shown in the exemplary embodiments of FIGS. 14-15C, the variable cross-section can also be circular, square, or any other.

Figure 14:
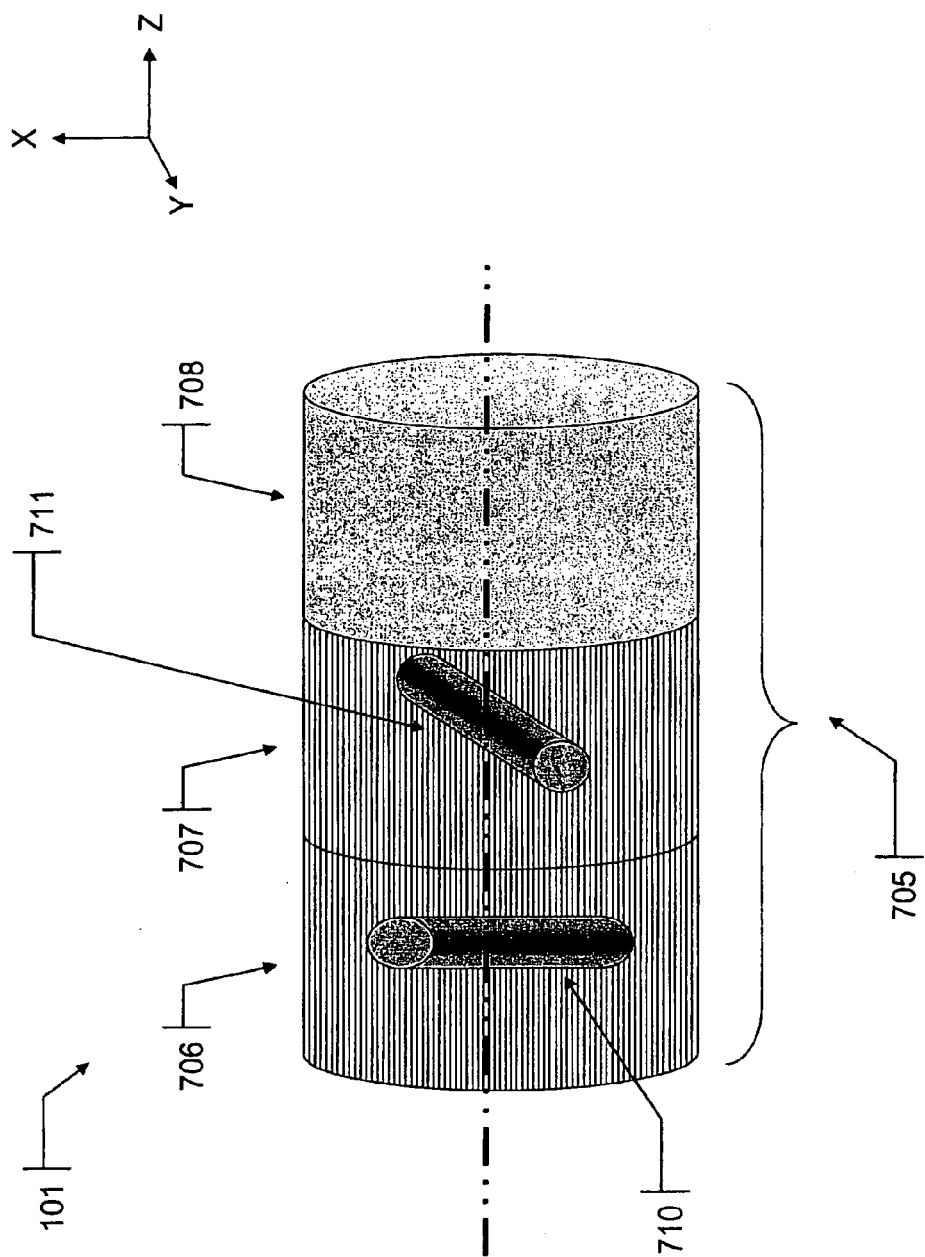

FIGS. 14-15C depict another exemplary embodiment of photonic device 101 as a waveguide configured to display the degenerate band edge in the electromagnetic k–ω diagram. In this exemplary embodiment, the effect of misaligned cross-sectional anisotropy of waveguide 101 is achieved by a non-uniform filling of waveguide 101, rather than by anisotropy of the shape of the external X-Y cross-section. Here, the non-uniform filling is provided by cylindrical insertions 710-711, although any manner of non-uniform filling can be used. In this embodiment with insertions 710-711, there are no essential restrictions on the shape of the X-Y cross-section of waveguide 101, for example, it can be circular, square, or any other. In this embodiment, the cross-section shape is circular and independent of Z (i.e., there is no periodic external shape modulation along the Z-direction, as in the exemplary embodiments described with respect to FIGS. 10-13). The photonic band gap structure in this case is created by a non-uniform filling (insertions 710-711) of waveguide 101. In FIG. 14, a single segment (unit cells) 705 of waveguide 101 is shown. The entire structure of waveguide 101 is obtained by repeating segment 705 in a periodic fashion along the waveguide axis, similar to the embodiments described with respect to FIGS. 1, 2 and 10.

In the exemplary embodiment depicted in FIG. 14, a single segment (a unit cell) 705 includes three contiguous portions 706, 707, 708, shown also separately in FIGS. 15A-C, respectively. One can view the role of portions 706 and 707 as being analogous to that of the respective layers 106 and 107 described with respect to FIG. 1, or portions 606 and 607 described with respect to FIG. 12. Specifically, portions 706 and 707 provide the misaligned structural anisotropy in the X-Y plane and, thereby, create the conditions for degenerate photonic band edge (3). In the embodiment depicted in FIG. 14, the anisotropy is created by misaligned cylindrical insertions 710 and 711, each of which is positioned in the center of the respective section and oriented perpendicular to the waveguide axis Z. The misalignment angle in the X-Y plane between insertions 710 and 711 is preferably different from 0 and π/2. It can be set, for example, as π/4, as shown in FIG. 15B, or it can be made variable to provide structural tunability. Portion 708 can be empty, or it can be filled with a uniform substance with low absorption at operational frequency range, or it can be omitted altogether. Otherwise, the description of photonic device 101, one segment 105 of which is depicted in FIG. 14, is similar to that in FIG. 10.

There can be a practically infinite number of specific waveguide realizations of photonic device 101 displaying the degenerate band edge (3). In the embodiment in FIG. 10, the desired effect is achieved by the misaligned shape anisotropy of the waveguide cross-section. In the embodiment in FIG. 14, the same effect is achieved by non-uniform filling of the waveguide. One can use any combination of these two embodiments, or one can also exploit the misaligned dielectric anisotropy of a periodic stratified structure, as described with respect to FIGS. 1-2. In any event, the electromagnetic band gap structure (i.e., the k–ω diagram) of photonic device 101 can develop a degenerate band edge (3) and, thereby, display the frozen mode regime, only if the periodic structure has the proper symmetry and possesses a certain degree of complexity. The embodiments described with respect to FIGS. 1-2 and 10-15C are only particular solutions or examples. One can use any combination of these embodiments or one can use other configurations not explicitly shown.

Described below are three exemplary methods in which photonic device 101 can be used. Each of the methods is referred to as an independent regime. It should be noted that operation in any one regime is dependent on the needs of the specific application, and that these regimes do not constitute an exhaustive list of potential uses for photonic device 101. In fact, photonic device 101 can be operated in any one or more of these three regimes as well as other regimes not explicitly described herein.

A first exemplary regime for photonic device 101 can be referred to as the frozen mode regime at degenerate band edge frequency. In this regime, an incident electromagnetic pulse 401 with central frequency close to that of the degenerate band edge is transmitted to photonic device 101, where it is converted into the frozen mode 402 having greatly enhanced amplitude and compressed length, similar to the exemplary embodiment described with respect to FIGS. 4A-C. Such a frozen mode does not propagate further through photonic device 101 than distance 404, and after a certain delay pulse is reflected back to space. During the time in which pulse 102 dwells inside photonic device 101, its amplitude can exceed that of the incident wave in air by several orders of magnitude. FIG. 5, which was previously described, depicts the steady-state realization of the frozen mode regime. The fact that the frozen mode amplitude is drastically enhanced compared to that of the incident wave can be used for enhancement of various processes resulting from light-matter interaction, for instance, higher harmonic generation, nonreciprocal Faraday rotation, light amplification by active media, etc. The frozen mode regime at degenerate band edge is fundamentally different from that associated with stationary inflection point and described in A. Figotin et al., U.S. Pat. No. 6,701,048. Indeed, in the case of stationary inflection point, the transmitted frozen mode slowly propagates through the photonic device until it reaches its opposite boundary or gets absorbed by the medium. By contrast, in the case of the degenerate band edge described herein, the incident wave is eventually reflected back to space, as illustrated in FIG. 4C.

A second exemplary regime for photonic device 101 can be referred to as the abnormal surface wave near degenerate band edge frequency regime. In the embodiments in FIGS. 1 and 2, the surface waves propagate along surface 111, normally to the Z direction. Typically, a surface wave rapidly decays with the distance from surface 111 between the photonic crystal and air, as depicted in FIG. 6. But, if the surface wave frequency is close to that of a degenerate band edge, the surface wave profile can change dramatically. The amplitude of such an abnormal surface wave sharply increases with the distance Z from the interface, before it starts to decay, as depicted in FIG. 7. The abnormal surface wave associated with degenerate band edge is much better confined inside photonic device 101 reducing the energy leakage outside the system, because the leakage rate is usually proportional to the squared field amplitude $A^2$ at the slab/air interface 111. This regime of abnormal surface wave is not exhibited in this precise manner in the exemplary embodiments of FIGS. 10-15C using a waveguide setting. A third exemplary regime for photonic device 101 can be referred to as giant Fabry-Perot cavity resonance near the degenerate band edge frequency. Periodically modulated waveguides, periodic layered structures, as well as periodic arrays with 2 and 3 dimensional periodicity terminated by plane-parallel boundaries, are known to display sharp transmission cavity resonances at frequencies close to a photonic band edge. This phenomenon has been widely used in resonance cavities for varies practical purposes. In the case of a regular photonic band edge (1), the amplitude A of the resonance field inside the photonic cavity can be estimated as $$A \propto NA_0, \quad (4)$$

where $A_0$ is the amplitude of the incident plane wave. Strong cavity resonance can require a large number N of unit cells (e.g., segments 105, 605 and 705) in the periodic structure. A similar resonance effect occurs in periodic structures in the vicinity of the degenerate photonic band edge (3), as depicted in FIG. 8. One difference though is that in the latter case, the resonance field amplitude is estimated as $$A \propto N^2 A_0, \quad (5)$$

and referred to as the giant transmission band edge resonance. This shows that a Fabry-Perot cavity based on photonic device 101 configured to display the degenerate band edge is much more efficient than previous versions. For instance, a resonance cavity with the degenerate band edge based on an exemplary embodiment of device 101 having 10 periodic segments (e.g, 105, 605 or 705), or unit cells, can perform as well as a regular Fabry-Perot photonic cavity composed of 100 periodic segments. The optimal number of segments (e.g., 105, 605 or 705) in the resonance cavity depends on specific application, but in any event, cavities based on photonic device 101 configured to display the degenerate band edge can be much smaller.

The embodiments described with respect to FIGS. 1-15C provide numerous advantages over conventional systems and devices. For instance, photonic device 101 does not have to include any magnetic components with strong Faraday rotation, as is the case in the devices described in A. Figotin et al., U.S. Pat. No. 6,701,048, entitled "Unidirectional Gyrotropic Photonic Crystal and Applications for the Same," which is fully incorporated by reference herein. Also, photonic device 101 can operate without the inclusion of layers with an oblique orientation of the anisotropy axis relative to the normal to the layers, similar to certain devices described in A. Figotin et al., U.S. patent application Ser. No. 10/839,117, filed May 3, 2004 and entitled "Systems and Methods for Transmitting Electromagnetic Energy in a Photonic Device," which is also fully incorporated by reference herein. In addition, the regime of the giant transmission resonance described above can be realized exclusively in the photonic devices configured to display degenerate photonic band edge (3). Additional information relating to photonic devices 101 configured to display degenerate band edges is contained in A. Figotin et al., "Gigantic Transmission Band-Edge Resonance in Periodic Stacks of Anisotropic Layers," Physical Review E 72, 036619, published Sep. 29, 2005, which is also fully incorporated by reference herein.

Photonic device 101 can be incorporated in numerous photonic systems implemented in a myriad of applications. For instance, photonic device 101 can be implemented as a tunable delay line, an efficient nonlinear element used for frequency conversion, wave mixing and the like, it can also be used as a high performance resonance cavity in an optical amplifier and in a laser, a host for a multi-dimensional optical network, an incident wave receiver and the like. It should be noted that these examples are not intended to limit, in any way, the systems and methods in which photonic device 101 can be used. Nor are these examples intended to limit photonic device 101 to any one type of system, application or technology.

Photonic Devices and Systems having Split Spectral Band Edge

A more detailed discussion of photonic devices and systems having split spectral band edges and methods for using the same are described below.

Every single implementation and device mentioned above can be slightly modified so that instead of a DBE, the respective dispersion relation displays a split photonic band edge (SBE). The modification may involve, but is not limited to, a small change in structural geometry of the periodic array and/or small change in physical characteristics of the materials involved, and/or small change of the angle of wave incidence on the boundary of the periodic structure. The exact nature of the modification is not important, because almost any small modification can transform a DBE to SBE. The functionality and performance of the modified device would remain basically the same except for one critical improvement. Namely, a SBE based device can utilize virtually 100% of the incident electromagnetic radiation regardless of its polarization. By comparison, the DBE based devices described above can utilize only one single polarization component of the incident electromagnetic wave, while the other polarization component is reflected back to space.

Another modification which can result in significant performance enhancement is positioning of a reflector (a mirror) next to the output boundary of the photonic device.

Physical Background

Wave propagation in spatially periodic media, such as photonic crystals, can be qualitatively different from any uniform substance. The differences are particularly pronounced when the wavelength is comparable to the primitive translation L of the periodic structure. The effects of strong spatial dispersion culminate at stationary points $\omega_s = \omega(k_s)$ of the Bloch dispersion relation where the group velocity $u = \partial\omega/\partial k$ of a traveling Bloch wave vanishes $$\frac{\partial \omega}{\partial k} = 0, \text{ at } k = k_s, \quad \omega = \omega_s = \omega(k_s). \quad (1)$$

One reason for this is that vanishing group velocity always implies a dramatic increase in density of modes at the respective frequency. In addition, vanishing group velocity also implies certain qualitative changes in the eigenmode structure, which can be accompanied by some spectacular effects in wave propagation. A particular example of the kind is the frozen mode regime associated with a dramatic amplitude enhancement of the wave transmitted to the periodic medium [2-7, 9]. In this specification, the focus is on a different slow-wave effect, namely, on a Fabry-Perot resonance in a plane-parallel photonic-crystal cavity. This phenomenon is also referred to as the transmission band edge resonance. There are some similarities between the frozen mode regime and the slow-wave cavity resonance in a plane-parallel photonic crystals. Both effects are associated with vanishing group velocity at a stationary point (1) of the dispersion relation. As a consequence, both effects are strongly dependent on specific type of spectral singularity (1). A fundamental difference though is that the frozen mode regime is not a resonance phenomenon in a sense that it is not particularly sensitive to the shape and size of the photonic crystal. For instance, the frozen mode regime can occur even in a semi-infinite periodic structure, where the incident plane wave is converted to a frozen mode slowly propagating through the periodic medium until it is absorbed. By contrast, in the case of a photonic-crystal cavity resonance, the entire bounded periodic structure acts as a resonator, resulting in a strong sensitivity of the resonance behavior to the size and shape of the photonic crystal.

Photonic-crystal cavity resonance has numerous and diverse practical applications. This slow-wave phenomenon is widely used for the enhancement of light-matter interactions such as nonlinear and nonreciprocal effects, optical activity, light amplification and lasing, etc. It can also be used in optical and microwave filters, delay lines, as well as for the enhancement of antenna gain and directionality. Our objective is to design a photonic crystal cavity with drastically reduced dimensions and enhanced performance, compared to that of a common Fabry-Perot resonator based on a periodic stack of non-birefringent layers. The idea is to employ periodic structures supporting the dispersion relations different from those allowed in periodic arrays of non-birefringent layers. Indeed, periodic arrays involving birefringent layers can display stationary points (1) different from a regular photonic band edge. Some examples are shown in FIG. 16. The slow waves associated with such stationary points can produce giant cavity resonances, much more powerful compared to those achievable in common layered structures. The first step in this direction was made in [1] and [8], where it was shown that the cavity resonance in the vicinity of a degenerate photonic band edge (DBE) in FIG. 16(*b*) produces much better results, compared to a regular photonic band edge (RBE) of FIG. 16(*a*). Specifically, at the frequency of a DBE related giant PCCR, the average electromagnetic energy density inside the photonic-crystal cavity can be estimated as $$\langle W_{DBE} \rangle \propto W_I N^4, \quad (2)$$

where $W_I$ is the energy density of the incident wave and N is the total number of unit cells in the periodic stack. By comparison, the energy density at a regular transmission band-edge resonance in FIG. 16(*a*) is $$\langle W_{RBE} \rangle \propto W_I N^2, \quad (3)$$

The estimations (2) and (3) imply that the Q-factor of a cavity with a DBE can be by factor $N^2$ higher compared to that of a regular cavity of the same size N. This is a huge difference.

Periodic structures involving birefringent layers have one fundamental problem. Namely, their reflectance and transmittance are essentially dependent on the incident wave polarization. This dependence is particularly strong near the edge of transmission band, where the cavity resonances occur. At the respective frequency range, a periodic stack with birefringent layers acts as a polarizer, reflecting back to space at least half of the incident wave energy. As a consequence, a DBE cavity works only with one (elliptic) polarization component of the incident wave, while the other polarization component is reflected by the periodic structure. Similar fundamental problem exists in all different modifications of the frozen mode regime considered in [3, 4, 6, 7, 9]. For many applications, such a polarization sensitivity may not be acceptable, and, thus, a way to utilize 100% of the incident wave energy needs to be found. In this specification, one of skill in the art is shown how to solve the polarization problem by slightly modifying the periodic layered array, so that instead of a DBE the respective spectral branch displays a split photonic band edge (SBE) shown in FIG. 16(*c*). Under the right conditions specified below, the photonic cavity with a SBE will display a giant transmission band edge resonance (2), similar to that of a DBE. But, in addition, the properly designed SBE cavity works equally well regardless of the incident wave polarization. The latter feature is of critical importance for a variety of practical applications. To distinguish this case from a DBE related PCCR, the term 'complete' giant PCCR is used, because in the SBE case, all the incident radiation is utilized, not just one polarization component.

Similar approach can be applied not only to a PCCR, but also to all different modifications of the frozen mode regime described in [3, 4, 6, 7, 9].

Photonic-Crystal Cavity Resonance (PCCR) in a Periodic Stack of Anisotropic Layers Dispersion Relation in Periodic Arrays of Birefringent Layers For simplicity, the case is restricted to a plane monochromatic wave normally incident on a plane-parallel periodic layered structure. Inside the periodic medium, the electromagnetic field is a superposition of Bloch eigenmodes $\Psi_k(z)$ defined by the following equality $$\Psi_k(z+L) = \Psi_k(z) \exp(ikL). \quad (4)$$

where L is the primitive translation. The direction z of wave propagation is normal to the layers. The Bloch wave number k in (4) is defined up to a multiple of $2\pi r/L$. Real k correspond to propagating (traveling) Bloch modes, while complex k correspond to evanescent modes. Evanescent modes can be relevant only near photonic crystal boundary, or some other defects of the periodic structure. The correspondence between the frequency ω and the Bloch wave number k is referred to as the Bloch dispersion relation. In reciprocal and/or centrosymmetric periodic structures, the Bloch dispersion relation is always symmetric with respect to the points k=0 and k=π/L of the Brillouin zone $$\omega(k_0+k) = \omega(k_0-k), \quad (5)$$

where $$k_0 = 0, \pi/L. \quad (6)$$

Typical examples of k–ω diagrams of periodic layered arrays are shown in FIG. 16. In periodic structures composed of non-birefringent dielectric layers, every Bloch wave is doubly degenerate with respect to polarization. If, on the other hand, some of the layers display an in-plane anisotropy or gyrotropy, the polarization degeneracy can be lifted, as shown in all examples in FIG. 16. Finally, if some of the layers are magnetic and the periodic array is non-centrosymmetric, the dispersion relation can also display spectral asymmetry $$\omega(k) \neq \omega(-k). \quad (7)$$

Examples of layered structures with asymmetric dispersion relation (7) can be found in [2, 3]. This specification only discusses non-magnetic structures, unless otherwise explicitly stated.

Every spectral branch of the k–ω diagram displays stationary points (1) associated with vanishing group velocity. Usually, such points are located at the center and at the boundary of the Brillouin zone $$k_s = k_0 = 0, \pi/L. \tag{8}$$

This is always the case in periodic layered structures composed of non-birefringent layers, where all stationary points coincide with photonic band edges. If, on the other hand, some of the layers in a unit cell are birefringent, then in addition to (8), the dispersion relation can also develop a reciprocal pair of stationary points corresponding to a general value of the Bloch wave number k, as shown in FIG. 16(c). The respective portion of the k–ω diagram can be described as a split band edge (SBE). In the case of normal wave propagation (k||z), the dispersion relation can develop a DBE or a SBE only in those periodic layered arrays involving birefringent layers with misaligned in-plane anisotropy. Examples of such layered structures are shown in [1].

Geometrical Condition for Photonic-Crystal Cavity Resonance

Consider a finite plane-parallel periodic structure composed of N unit cells L. If the number N is significant, the electromagnetic properties of the periodic stack can be effectively described in terms of the Bloch eigenmodes (4) of the corresponding infinite periodic layered medium. For instance, a periodic stack having as few as several periods L can display almost total reflectivity at photonic band gap frequencies, which reflects the absence of propagating Bloch modes at the respective frequency range.

A typical dependence of finite stack transmittance on the incident wave frequency is shown in [8] and [1]. The series of sharp peaks in the transmission band corresponds to photonic-crystal cavity resonances (PCCR). The resonance frequencies are located close to a photonic band edge, where the Bloch waves have very low group velocity. At each resonance m, the electromagnetic field Ψ(z) inside the periodic stack is close to a standing wave composed of a pair of reciprocal Bloch waves $$\Psi_T(z) = \Psi_{k_m}(z) + \Psi_{-k_m}(z), \; 0 < z < D = NL, \tag{9}$$

with large and nearly equal amplitudes and low group velocity. The photonic crystal boundaries coincide with the standing wave nodes, where the forward and backward Bloch waves interfere destructively to meet the boundary conditions. The latter circumstance determines the wave numbers of the forward and backward Bloch components at the resonance frequencies $$(k_m - k_0) \approx \pm \frac{\pi}{NL} m, \quad m = 1, 2, \ldots, \tag{10}$$

where $k_0$ is defined in (6). The integer m denotes the resonance peaks in order of their distance from the photonic band edge. The respective resonance frequencies are expressed in terms of the dispersion relation $$\omega_m = \omega(k_m). \tag{11}$$

The proximity of PCCR to the photonic band edge is determined by the number N of unit cells in the periodic stack. The expressions (10) and (11) only apply if $$N \gg m. \tag{12}$$

The following dimensionless notations are introduced for the small deviation of the wave number and the frequency from the respective stationary point $$\kappa = |k - k_0| L, \; \nu(\kappa) = [\omega(k) - \omega(k_0)] L / c. \tag{13}$$

According to (10) and (11), the resonance values of k and ν are $$\kappa_m \approx \frac{\pi}{N} m \ll 1, \quad \nu_m \approx \nu(\kappa_m). \tag{14}$$

The most powerful resonance is usually the one closest to the respective photonic band edge $$\kappa_1 \approx \frac{\pi}{N} \ll 1, \quad \nu_1 \approx \nu(\kappa_1). \tag{15}$$

PCCR in the Vicinity of SBE

The relations (9) through (15) describe the resonance conditions for a single pair (9) of reciprocal Bloch waves. In periodic stacks involving birefringent layers, a PCCR produced by a single pair of reciprocal. Bloch waves can be excited only by one polarization component of the incident plane wave. This implies that if the incident wave polarization is random, then at least half of the incident light energy will not enter the periodic medium and will be reflected back to space by the photonic crystal boundary. For instance, this scenario always occurs at DBE related giant PCCR. At certain frequencies, though, there can be two pairs of reciprocal Bloch waves with different wave numbers; each pair having its own polarization. Of particular interest here is the frequency range $$\omega_0 < \omega < \omega_b \tag{16}$$

of the k–ω diagram in FIG. 16(c). This frequency range covers a narrow portion of the transmission band which includes the SBE. At any given frequency from (16), there are two pairs of reciprocal Bloch waves with very low group velocity and different polarizations; each pair being capable of producing its own PCCR with the resonance conditions similar to (10) or (14). Our focus is on the possibility of the two resonances occurring at the same frequency. Such a situation will be referred to as the double resonance. It turns out that the double PCCR is as powerful as a giant PCCR associated with a DBE. But, in addition, a SBE related double PCCR utilizes all the energy of incident light regardless of its polarization. By contrast, a DBE related giant PCCR utilizes only a single polarization component, the rest of the incident light energy is reflected back to space.

To start with, the dispersion curve is considered with a SBE in FIG. 16(c) in more detail. If the split between the twin band edges $b_1$ and $b_2$ in FIG. 16(c) is small, the dispersion relation in the vicinity of SBE can be approximated as $$\nu(\kappa) \approx \frac{a}{2} \kappa^2 + \frac{b}{4} \kappa^4, \tag{17}$$

where $$a/b < 0 \tag{18}$$

and $$|a/b| \ll 1. \tag{19}$$

The inequality (18) is the condition for SBE. Indeed, in the opposite case of $$a/b>0, \quad (20)$$

the dispersion curve (17) would develop a RBE at k=0, as shown in FIG. 16(a) While in the case $$a/b=0, \quad (21)$$

the dispersion curve (17) would have a DBE at k=0, as shown in FIG. 16(b). The additional inequality (19) is the condition for the proximity of the SBE to a DBE. This proximity allows us to use the expansion (17) in the frequency range spanning both twin edges of the SBE in FIG. 1(c). More importantly, the condition (19) is essential for the phenomenon of the giant PCCR in the vicinity of SBE. Later in this section it will be seen that the value of a/b corresponding to a double PCCR is proportional to $N^{-2}$. Or the reverse—the thickness of the periodic stack supporting double PCCR, is proportional to $(a/b)^{-2}$.

There are three stationary points associated with SBE in FIG. 1(c). The first one is trivial $$\kappa_a=0, v_a=0. \quad (22)$$

It is located either at the center of the Brillouin zone, or at its boundary. The other two stationary points correspond to the actual SBE $$\pm\kappa_b=\pm\sqrt{-a/b}, v_b=-a^2/4b. \quad (23)$$

Taking into account (23), the condition (19) for the proximity of the SBE to a DBE can be recast as $$\kappa_b \ll 1. \quad (24)$$

The condition (24) implies that the points $b_1$ and $b_2$ on the dispersion curve are close to each other.

In what follows, for simplicity it is assumed that $$b<0<a. \quad (25)$$

In this case, the SBE in question corresponds to the upper edge of the transmission band, as shown in FIG. 16(c). The alternative case of $$a<0<b \quad (26)$$

corresponds to the SBE being the lower edge of the transmission band. There is no qualitative difference between the two cases.

At any given frequency v within the range $$v_a<v<v_b, \quad (27)$$

there are two pairs of reciprocal Bloch wave. Each pair comprises one forward and one backward propagating modes with equal and opposite wave numbers and group velocities $$\pm\kappa_{in} = \pm\kappa_b\sqrt{1-\sqrt{1-\frac{v}{v_b}}}, \quad v_a < v < v_b. \quad (28)$$

$$\pm\kappa_{ex} = \pm\kappa_b\sqrt{1+\sqrt{1-\frac{v}{v_b}}}, \quad v < v_b, \quad (29)$$

The pair of wave numbers (28) corresponds to the concave portion of the dispersion curve (17), while the pair of wave numbers (29) corresponds to the convex portion of the dispersion curve. Obviously, $$|\kappa_{in}|<|\kappa_{ex}|, \text{ at } v_a<v<v_b. \quad (30)$$

Double PCCR

Within the frequency range (27), either pair of the reciprocal Bloch waves (28) and (29) can develop a PCCR. Of particular interest here is the situation where a PCCR associated with one pair of the reciprocal Bloch waves occurs at the same or almost the same frequency as that of the other pair of the reciprocal Bloch waves. This situation is referred to as a double PCCR.

Starting with case (28) of the reciprocal pair of Bloch waves corresponding to the concave section of the dispersion curve, it is possible that the frequency range (27) contains only a single PCCR—the one with m=1. According to (23) and (10), the condition for a single PCCR is $$\kappa_1 < \kappa_b < 2\kappa_1, \quad \kappa_{in} = \kappa_1 = \frac{\pi}{N}. \quad (31)$$

The respective resonance frequency $v_r$ is determined by (11) and (17)

$$v_r = v_1 = \frac{a}{2}\kappa_1^2 + \frac{b}{4}\kappa_1^4, \quad (32)$$

where $k_1=\pi/N$.

Consider now a PCCR associated with the reciprocal pair (29) of Bloch waves corresponding to the convex section of the dispersion curve. The condition that the latter PCCR occurs at the same frequency (32) as the PCCR related to the concave section (28) of the dispersion curve is imposed $$v_r = \frac{a}{2}\kappa_{in}^2 + \frac{b}{4}\kappa_{in}^4 = \frac{a}{2}\kappa_{ex}^2 + \frac{b}{4}\kappa_{ex}^4$$

Simple analysis shows that it is only possible if at $v=v_r$ the following is given $$\kappa_{ex} = 2\kappa_{in} = 2\kappa_1 = \frac{2\pi}{N}.$$

The relation $$k_{ex}=2k_{in}$$

together with (28) and (29) yield $$\kappa_b = \sqrt{\frac{5}{2}}\kappa_1 = \sqrt{\frac{5}{2}}\frac{\pi}{N}.$$

The frequency of the double PCCR is $$v_r = \left(\frac{4}{5}\right)^2 v_b = \frac{2}{5}b\kappa_1^2 = \frac{2}{5}b\left(\frac{\pi}{N}\right)^2.$$

The group velocities of the two reciprocal pairs of Bloch waves at the resonance frequency $v_r$ are $$u_{in} = \mp\frac{3}{3}b\kappa_1^3 = \mp\frac{3}{2}b\left(\frac{\pi}{N}\right)^3.$$

and $$u_{ex} = \pm 3b\kappa_1^3 = \pm 3b\left(\frac{\pi}{N}\right)^3.$$

By comparison, in the case of DBE related PCCR, the following estimations are provided for the resonance frequency $v_1$ and the respective group velocity of the two Bloch components $$v_1 \propto b\left(\frac{\pi}{N}\right)^2, \quad u \propto \pm b\left(\frac{\pi}{N}\right)^3,$$

which are similar to the case of double PCCR at SBE. This similarity proves that both DBE-related giant PCCR and SBE-related double PCCR produce the same field enhancement (2). At the same time, our numerical analysis shows that the SBE-related double PCCR provides 100% conversion of the incident wave into the resonance field inside the periodic stack. By contrast, in the case of DBE-related giant PCCR, more than half of the incident wave energy is reflected back to space even before in enters the periodic medium.

Slow-Wave Resonance in Periodic Stacks of Anisotropic Layers

A detailed discussion of photonic devices and systems and methods for using the same according to various embodiments of the invention are described below.

A Fabry-Perot resonance (a transmission band edge resonance) in periodic layered structures involving birefringent layers is considered. In a previous publication [Phys. Rev. E 72, 036619 (2005)] it has been shown that the presence of birefringent layers with misaligned in-plane anisotropy can dramatically enhance the performance of the photonic-crystal resonator. It allows us to reduce its size by an order of magnitude without compromising on its performance. The key characteristic of the enhanced slow-wave resonator is that the Bloch dispersion relation ω(k) of the periodic structure displays a degenerate photonic band edge, in the vicinity of which the dispersion curve can be approximated as Δω~(Δk)$^4$, rather than Δω~(Δk)$^2$. Such a situation can be realized in specially arranged stacks of misaligned anisotropic layers. On the down side, the presence of birefringent layers results in the slow-wave resonance being coupled only with one (elliptic) polarization component of the incident wave, while the other polarization component is reflected back to space. Here, it is shown how a small modification of the periodic layered array can solve the above fundamental problem and provide a perfect impedance match regardless of the incident wave polarization, while preserving the giant slow-wave resonance characteristic of a degenerate photonic band edge. Both features are of critical importance for many practical applications, such as the enhancement of various light-matter interactions, light amplification and lasing, optical and microwave filters, antennas, etc.

Physical Background

Wave propagation in spatially periodic media, such as photonic crystals, can be qualitatively different from any uniform substance. The differences are particularly pronounced when the wavelength is comparable to the primitive translation L of the periodic structure [11-17]. The effects of strong spatial dispersion culminate at stationary points $\omega_s = \omega(k_s)$ of the Bloch dispersion relation where the group velocity $u = \partial\omega/\partial k$ of a traveling Bloch wave vanishes $$\frac{\partial \omega}{\partial k} = 0, \text{ at } k = k_s, \quad \omega = \omega_s = \omega(k_s). \tag{1}$$

One reason for this is that vanishing group velocity always implies a dramatic increase in density of modes at the respective frequency. In addition, vanishing group velocity also implies certain qualitative changes in the eigenmode structure, which can be accompanied by some spectacular effects in wave propagation. A particular example of the kind is the frozen mode regime associated with a dramatic amplitude enhancement of the wave transmitted to the periodic medium [18-23]. In this specification, the focus is on a different slow-wave effect, namely, on a Fabry-Perot resonance in bounded photonic crystals. This slow wave phenomenon, illustrated in FIGS. 1 and 2, is also referred to as the transmission band edge resonance. There are some similarities between the frozen mode regime and the slow-wave resonance in plane-parallel photonic crystals. Both effects are associated with vanishing group velocity at stationary point (1) of the Bloch dispersion relation. As a consequence, both effects are strongly dependent on specific type of spectral singularity (1). A fundamental difference though is that the frozen mode regime is not a resonance phenomenon in the sense that it is not particularly sensitive to the shape and size of the photonic crystal. For instance, the frozen mode regime can occur even in a semi-infinite periodic structure, where the incident plane wave is converted to a frozen mode slowly propagating through the periodic medium until it is absorbed [18-23]. By contrast, in the case of a slow-wave resonance, the entire bounded periodic structure acts as a resonator, resulting in a strong sensitivity of the resonance behavior to the size and shape of the photonic crystal.

It is also important to distinguish between two qualitatively different classes of photonic-crystal resonators. The first class comprises resonance cavities where the role of periodic dielectric structure reduces to electromagnetic (EM) field confinement by reflecting it back to the cavity interior. The resonance frequency (or frequencies) of such photonic cavities usually lies in a frequency gap (a stop band) of the photonic crystal. The periodic dielectric array here plays the role of a distributed Bragg reflector. The number of resonance modes depends on the cavity size. It can be a single mode localized on an isolated defect inside the photonic crystal [24,25]. Or the cavity can support multiple resonances, if its size significantly exceeds the light wavelength. More detailed information on photonic crystal cavities can be found in numerous papers and monographs on optics and photonics (see, for example, Ref. [26], and references therein). In this specification, the subject will not be discussed further.

Figure 17:
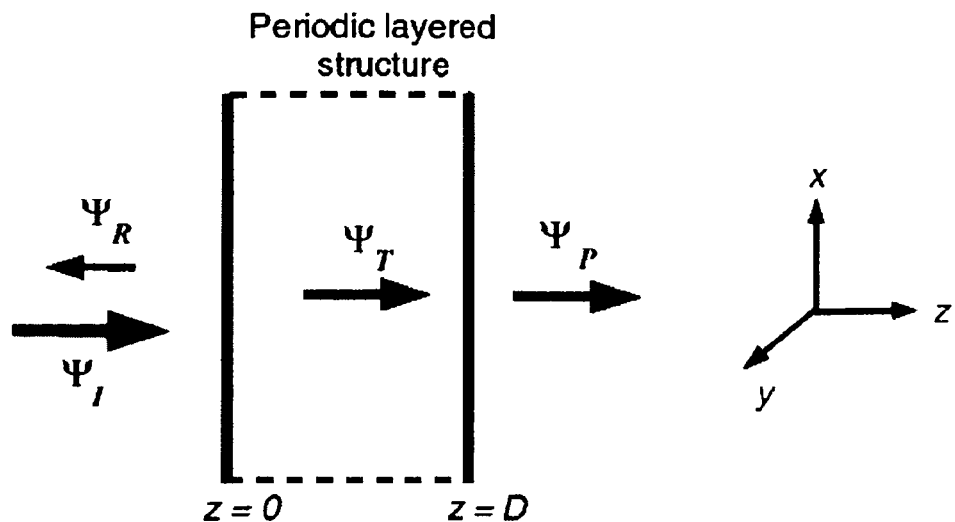
FIG. 17 illustrates the scattering problem of a plane wave normally incident on a periodic stack of dielectric layers. The indices I, R, and P denote the incident, reflected, and transmitted waves, respectively. The field inside the periodic medium $\psi_T$. In the case of a slow wave resonance, the incident wave frequency lies in a transmission band of the periodic structure, close to a band edge, as illustrated in FIG. 18.
Figure 18A:
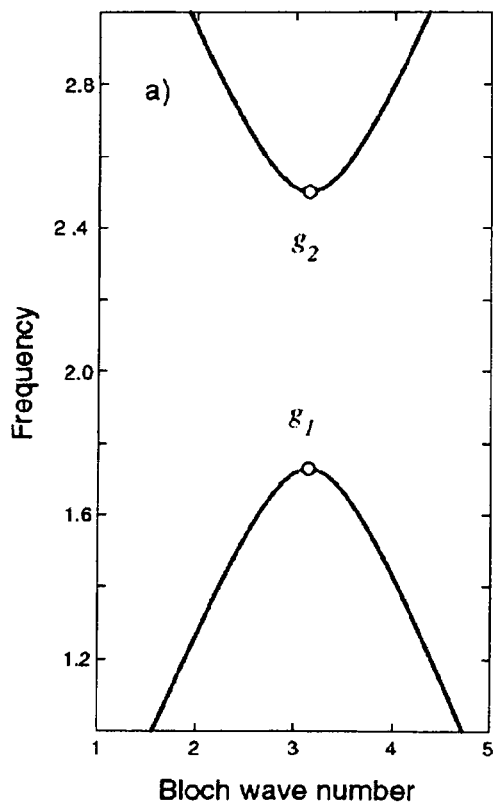
FIG. 18(a) is a graph depicting a fragment of a Bloch k–ω diagram of a periodic array composed of nonbirefringent layers; $g_1$ and $g_2$ are the edges of the lowest photonic band gap. Each spectral branch is doubly degenerate with respect to the wave polarization.
Figure 18B:
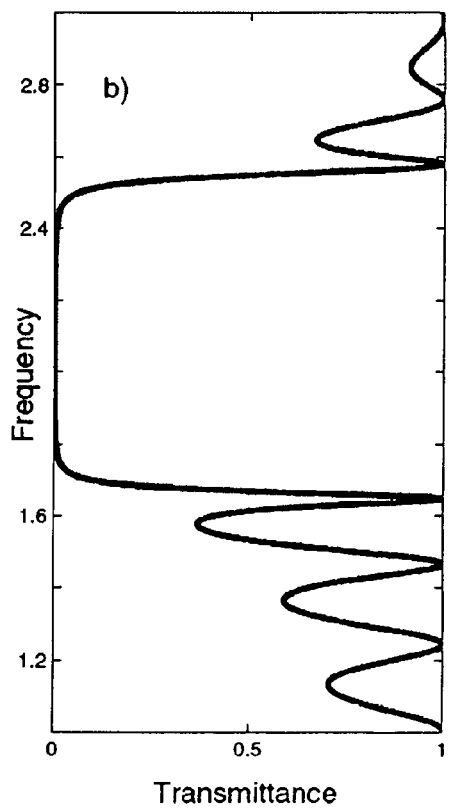
FIG. 18(b) is a graph depicting the transmission dispersion t(ω) of the respective finite periodic stack; the sharp peaks near the edges of the transmission bands are associated with slow-wave Fabry-Perot resonances, also known as transmission band edge resonances. The location (6) of the resonance peaks depends on the number N of unit cells L in the periodic stack. Wave number k and frequency ω are expressed in units of $L^{-1}$ and $cL^{-1}$, respectively.

The second class of photonic-crystal resonators comprises the so-called slow-wave resonators. They are qualitatively different from the band-gap cavities. In slow-wave photonic-crystal resonators, the reflectors may not be needed at all, as shown in the example in FIG. 17. The role of the periodic structure here is to support slow EM waves. The resonance frequencies lie in the transmission bands of the photonic crystal—not in band gaps, although, they can be very close to a band edge (1), as shown in FIG. 18. A typical example of slow wave resonance in a photonic crystal is presented by the transmission band edge resonance, illustrated in FIGS. 17 and 18. In certain cases, slow-wave resonators can provide significant advantages over cavity resonators. They are used for the enhancement of light-matter interactions, such as nonlinear and nonreciprocal effects, optical activity, light amplification and lasing, etc. They can also be used in optical and micro-wave filters, delay lines, as well as for the enhancement of antenna gain and directionality. More detailed information can be found in the extensive literature on the subject (see, for example, Refs. [14-16,27-32], and references therein).

Figure 19A:
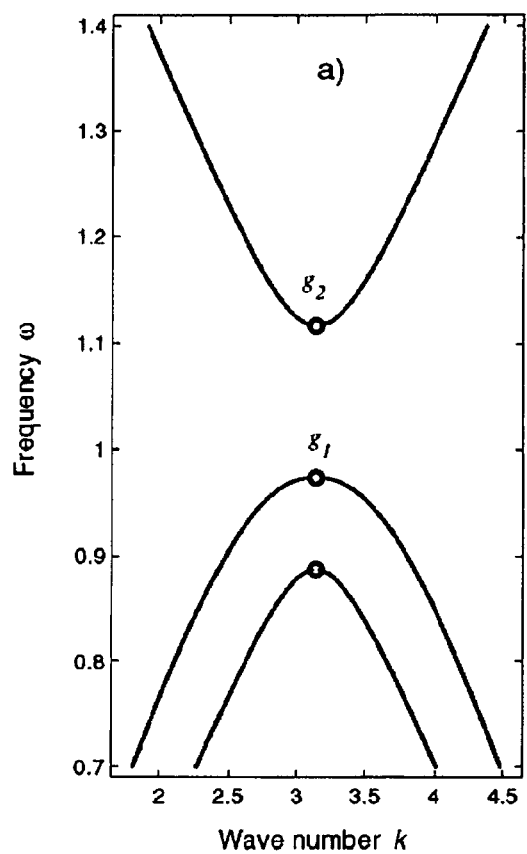
FIGS. 19(a)-(b) are graphs depicting fragments of the diagrams of the periodic structure in FIG. 22 for two different values of the ration A/B of the layer thicknesses. Regular, degenerate, and split photonic band edges are denoted by symbols g, d, and b, respectively. The Bloch wave number k and the frequency ω are expressed in units of l/L and c/L.
Figure 19B:
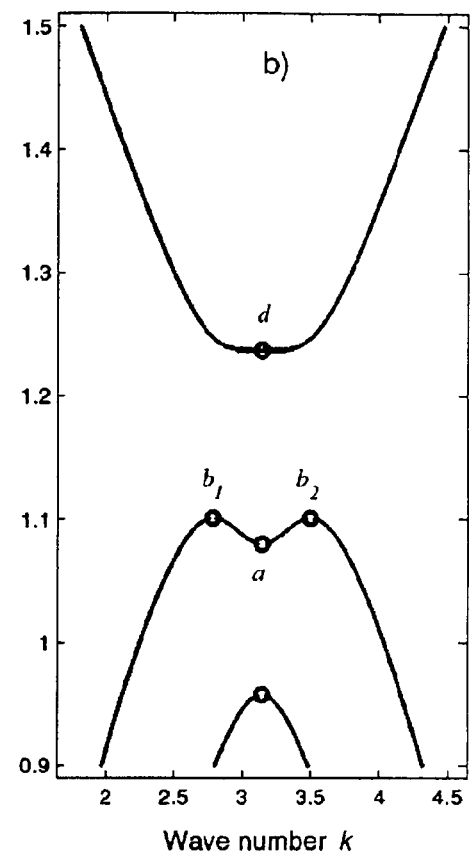
Figure 20A:
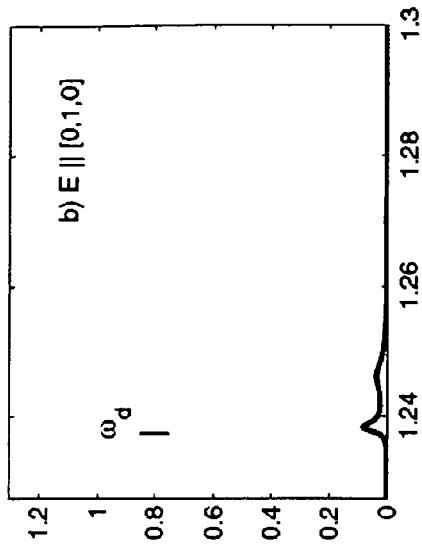
FIGS. 20(a)-(d) are graphs depicting transmission dispersion of the periodic stack of 18 unit cells at a frequency range including the DBE at $\omega=\omega_d$. The respective k–ω diagram is shown in FIG. 19(b). In the cases of FIGS. 20(a) and (b), the incident wave is linearly polarized. In the cases of FIGS. 20(c) and (d), the incident wave polarization is adjusted so that at any given frequency it corresponds to a single mode excitation regime: in the case (c) it is a single propagating mode, while in the case (d) it is a single evanescent mode. Obviously, in the latter case the incident wave is reflected back to space. The frequency is expressed ω in units of $cL^{-1}$.
Figure 20B:
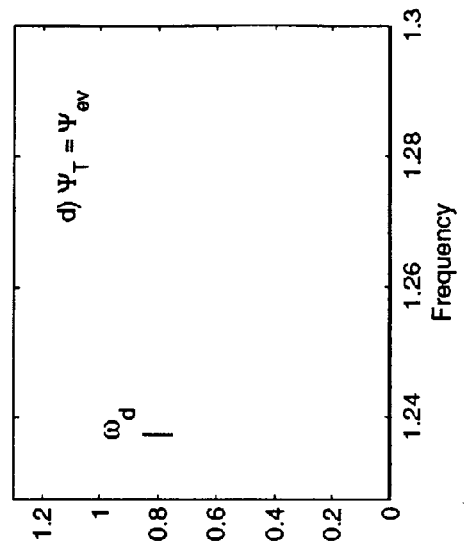
Figure 20C:
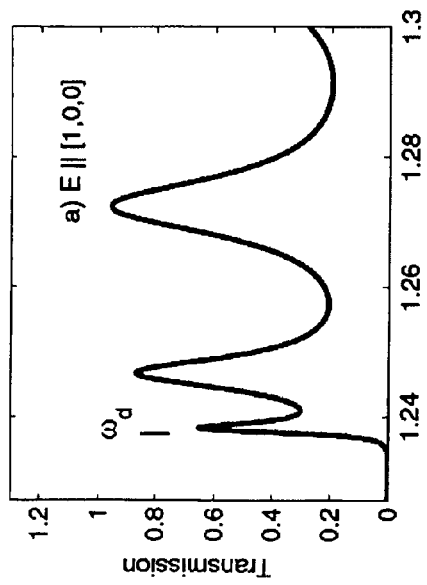
Figure 20D:
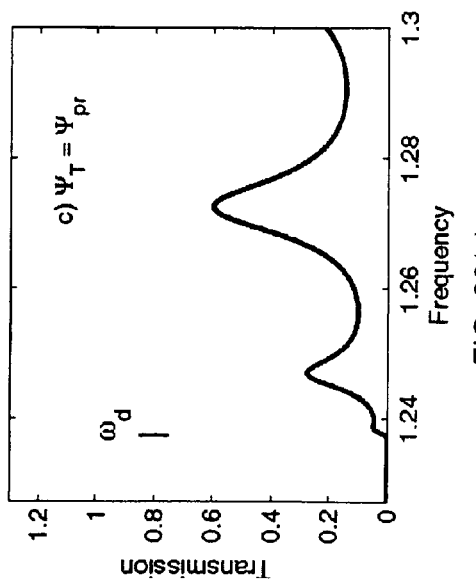

In the specification, a slow-wave photonic-crystal resonator is described with drastically reduced dimensions and enhanced performance, compared to that of a common Fabry-Perot resonator based on a periodic stack of nonbirefringent layers. The idea is to employ periodic structures supporting the dispersion relations different from those allowed in periodic arrays of nonbirefringent layers. Indeed, periodic arrays involving birefringent layers can display stationary points (1) different from a regular photonic band edge in FIG. 18(a). Some examples are shown in FIG. 19. Slow waves associated with such stationary points can produce giant transmission band-edge resonances, much more powerful compared to those achievable in common layered structures. The first step in this direction was made in Ref. [33], where it was shown that the transmission band-edge resonance in the vicinity of a degenerate photonic band edge (DBE) in FIG. 19(b) produces much better results, compared to a regular photonic band edge (RBE) of FIGS. 18(a) and 19(a). Specifically, at the frequency of DBE related giant slow-wave resonance, the electromagnetic energy density inside the photonic-crystal can be estimated as $$\langle W_{DBE} \rangle \propto W_I N^4. \tag{2}$$

where $W_I$ is the energy density of the incident wave and N is the total number of unit cells in the periodic stack. By comparison, the average EM energy density at a regular transmission band-edge resonance in FIG. 18 is $$\langle W_{RBE} \rangle \propto W_I N^2. \tag{3}$$

The estimations (2) and (3) imply that the Q factor of a DBE-based slow-wave resonator can be by factor $N^2$ higher compared to that of a RBE related Fabry-Perot resonator of the same size; this a huge difference. A detailed comparative analysis of the giant DBE related slow-wave resonance versus the regular transmission band edge resonance can be found in Ref. [33].

On the down side, periodic structures with birefringent layers have a fundamental problem—their reflectance and transmittance are essentially dependent on the incident wave polarization. This dependence is particularly strong near the edges of transmission bands, where the slow-wave resonances occur. In particular, a DBE related giant transmission resonance described in Ref. [33] is coupled only with one (elliptic) polarization component of the incident wave, while the other polarization component is reflected back to space by the photonic crystal boundary [33]. In other words, at the resonance frequency, a periodic stack involving birefringent layers acts as a polarizer, reflecting back to space roughly half of the incident wave energy. This behavior is illustrated in FIGS. 20 and 21. Similar problem exists in all different modifications of the frozen mode regime considered in Refs. [18-23]. For many applications, such a polarization selectivity may not be acceptable. In this specification, a solution is provided to the above problem, which shows how to utilize all the incident wave energy, while preserving the extraordinary performance of the DBE based photonic-crystal resonator. The idea is to modify the periodic layered array so that instead of a degenerate band edge, the respective dispersion curve develops a split photonic band edge (SBE) shown in FIG. 19(b). Under certain conditions specified below, the photonic resonator with a SBE will display a giant transmission band edge resonance, similar to that of a DBE. But, in addition, the SBE resonator couples with the incident wave regardless of its polarization and, therefore, utilizes all the incident EM radiation—not just one polarization component. The latter feature is of critical importance for a variety of practical applications. Similar approach can be applied not only to a photonic-crystal cavity resonance, but also to all different modifications of the frozen mode regime described in Refs. [18-23].

Geometrical Description of Slow-Wave Resonance

Steady-state Fabry-Perot resonance in a plane-parallel photonic crystal is commonly described as a standing Bloch wave composed of a pair of reciprocal propagating Bloch modes with equal and opposite wave numbers and group velocities $$\Psi_T(z) = \Psi_k(z) + \Psi_{-k}(z). \ 0 < z < D. \tag{4}$$

At a resonance, the two propagating Bloch components in Eq. (4) have large and nearly equal amplitudes and low group velocities. Two nodes of the standing wave coincide with the photonic crystal boundaries at z=0 and z=D, which determines the resonance values $k_m$ of the Bloch wave number k $$k_m \approx k_0 \pm \frac{\pi}{NL} m, \ m = 1, 2, \ldots, \tag{5}$$

where $k_0$ coincides with one of stationary points (1) of the dispersion relation $\omega(k)$ (usually, $k_0$=0 or Ir). The integer m denotes the resonance peaks in order of their distance from the respective photonic band edge at $k_0$. The resonance frequencies $\omega_m$ are expressed in terms of the Bloch dispersion relation $$\omega_m = \omega(k_m). \tag{6}$$

and located close to the photonic band edge at $\omega_0 = \omega(k_0)$. According to Eq. (5), the proximity of the resonances to the photonic band edge is determined by the number N of unit cells in the periodic stack. The expressions (5) and (6) only apply if $$N \gg m. \tag{7}$$

The simple representation (4) for the resonance field distribution works very well in the vicinity of a regular photonic band edge (RBE). In the case of a giant transmission resonance associated with a degenerate photonic band edge (DBE), the above simple picture does not apply. Indeed, according to Ref. [33], in the vicinity of a DBE, the evanescent mode contribution becomes equally important, and the resonance field $\Psi_T(z)$ cannot be viewed as a simple standing Bloch wave (4). Yet another qualitatively different situation can occur in the vicinity of a split photonic band edge (SBE), provided that the magnitude of the split between the edges $b_1$ and $b_2$ in FIG. 19(b) is small enough so that the respective SBE is close in shape to a DBE. In this latter case, a giant transmission resonance (2) is produced by interference of two pairs of reciprocal propagating Bloch waves $$\Psi_T(z) = \Psi_A(z) + \Psi_B(z). \ 0 < z < D. \tag{8}$$

where $$\Psi_A(z) = \Psi_{k_A}(z) + \Psi_{-k_A}(z) \tag{9}$$

and $$\Psi_B(z) = \Psi_{k_B}(z) + \Psi_{-k_B}(z). \tag{10}$$

Figure 22:
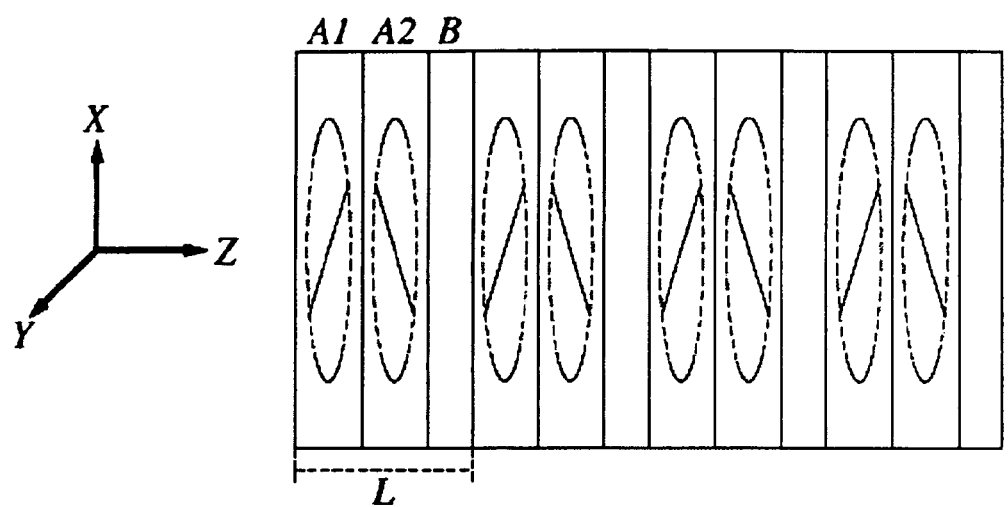
FIG. 22 is a diagram depicting a periodic layered structure with a unit cell L containing two misaligned anisotropic A layers, and one isotropic B layer. The respective dielectric permittivity tensors are given in Eqs. (B1), (B2), and (B4). This is the simplest layered array supporting Bloch dispersion relation with a DBE and/or a SBE, as shown in FIG. 19(b).
Figure 24A:
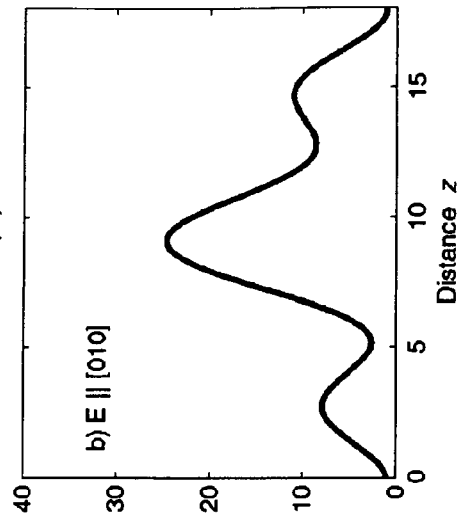
FIGS. 24(a)-(d) are graphs depicting the smoothed energy density distribution at the frequency of the SBE related giant transmission resonance in FIG. 23 for four different polarizations of the incident wave. The cases (c) and (d) relate to a single mode excitation regime. The distance is expressed in units of L.
Figure 24B:
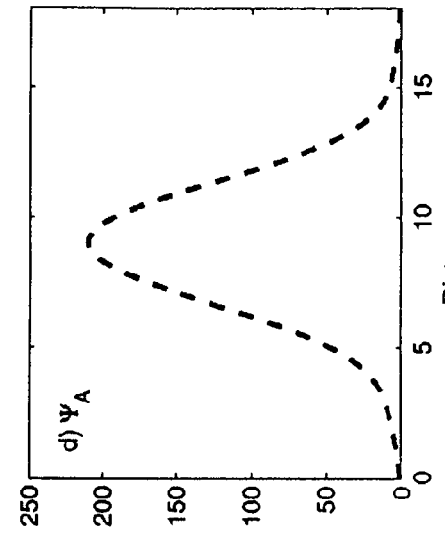
Figure 24C:
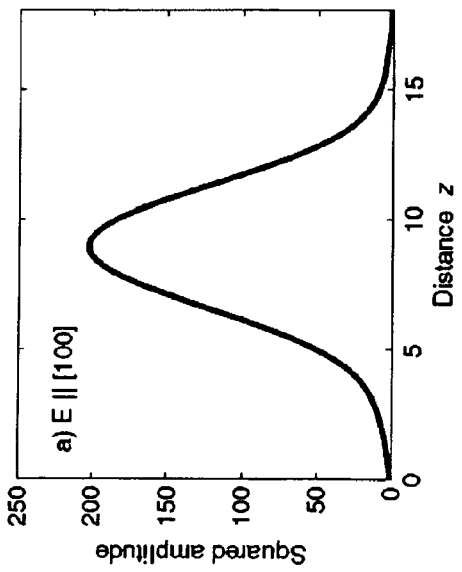
Figure 24D:
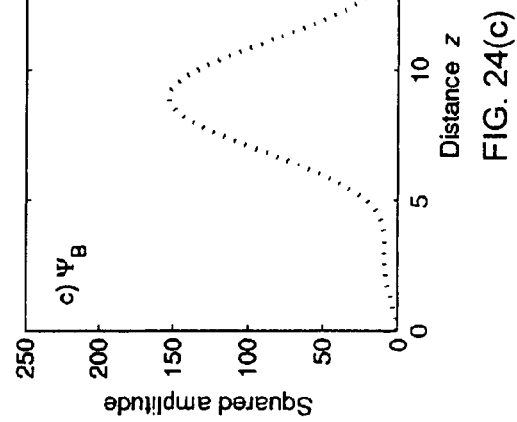

Either a DBE or a SBE can only exist in periodic stacks involving misaligned birefringent layers, example of which is shown in FIG. 22. The same photonic crystal can develop both a DBE and a SBE at different frequencies, as shown in FIG. 19(*b*). Either of them can produce a giant transmission resonance (2). The difference, though, is that a DBE related giant transmission resonance is coupled with only one of the two polarization components of the incident light [23,33], as shown in FIGS. 20 and 21. By contrast, an equally powerful RBE related transmission resonance can be polarization independent, as illustrated in FIGS. 23 and 24. The latter feature is a significant advantage for most applications.

For simplicity, the case is restricted a plane monochromatic wave normally incident on a layered structure, as shown in FIG. 16. The results can be easily generalized to the case of oblique incidence, as it was done, for example, in Refs. [9,13]. Basic notations and definitions of electrodynamics of stratified media involving birefringent layers are explained below. Similar notations and terminology are used, for instance, in Refs. [18,19,23,33].

Transmission Band-Edge Resonance in the Vicinity of a Split Photonic Band Edge

Consider the vicinity of a split photonic band edge (SBE) on the k–ω diagram in FIG. 19(*b*). The physical characteristics of the periodic structure are chosen so that the SBE in FIG. 19(*b*) is close in shape to a DBE. The frequency range $$\omega_0 < \omega < \omega_b. \quad (11)$$

covers a narrow portion of the transmission band which includes the SBE. At any given frequency from Eq. (11), there are two pairs of reciprocal Bloch waves with very low group velocity and different polarizations; each pair being capable of producing its own slow-wave cavity resonance with the resonance conditions similar to Eq. (5). Our focus is on the possibility of the two resonances occurring at the same frequency. Such a situation will be referred to as the double resonance. It turns out that the double transmission band edge resonance is as powerful as the giant resonance associated with a DBE. However, in addition, a SBE related resonance utilizes all the energy of the incident wave regardless of its polarization. By contrast, a DBE based giant transmission resonance is coupled only with one polarization component of the incident wave; the rest of the incident wave energy being reflected back to space. This important difference is obvious if the DBE related transmission dispersion shown in FIG. 20 and the SBE related transmission dispersion shown in FIG. 23 is compared.

The following dimensionless notations for the small deviation of the wave number and the frequency from the respective stationary point is introduced:

$$\kappa = |k - k_0|L, \ \nu(\kappa) = [\omega(k) - \omega(k_0)]L/c. \quad (12)$$

According to Esq. (5) and (6), the resonance values of κ and ν are $$\kappa_m \approx \frac{\pi}{N} m \ll 1, \ \nu_m \approx \nu(\kappa_m). \quad (13)$$

The most powerful resonance is usually the one closest to the respective photonic band edge $$\kappa_1 \approx \frac{\pi}{N} \ll 1. \quad (14)$$

$$\nu_1 \approx \nu(\kappa_1).$$

A dispersion curve is considered with a SBE in more detail. If the split between the twin band edges $b_1$ and $b_2$ in FIG. 19(*b*) is small, the dispersion relation in the vicinity of SBE can be approximated as $$\nu(\kappa) \approx \frac{a}{2}\kappa^2 + \frac{b}{4}\kappa^4. \quad (15)$$

where $$a/b < 0 \quad (16)$$

and $$|a/b| \ll 1. \quad (17)$$

The inequality (16) is the condition for SBE. Indeed, in the opposite case of $$a/b > 0, \quad (18)$$

the dispersion curve (15) would develop a RBE at κ=0, as shown in FIG. 19(*a*). While in the case $$a/b = 0, \quad (19)$$

the dispersion curve (15) would have a DBE at κ=0. The additional inequality (17) is the condition for the proximity of the SBE to a DBE. This proximity allows us to use the expansion (15) in the frequency range spanning both twin edges of the SBE. More importantly, the condition (17) is essential for the phenomenon of the giant transmission resonance in the vicinity of SBE.

There are three stationary points associated with a SBE. The first one is trivial $$\kappa_a = 0, \ \nu_a = 0. \quad (20)$$

It is located either at the center of the Brillouin zone, or at its boundary. The other two stationary points correspond to the actual SBE $$\pm \kappa_b = \pm \sqrt{-a/b}, \ \nu_b = -a^2/4b. \quad (21)$$

Taking into account Eq. (21), the condition (17) for the proximity of the SBE to a DBE can be recast as $$\kappa_b \ll 1. \quad (22)$$

The condition (22) implies that the points $b_1$ and $b_2$ on the dispersion curve are close to each other.

In what follows, it is assumed for simplicity that $$b < 0 < a. \quad (23)$$

In this case, the SBE in question corresponds to the upper edge of the transmission band, as shown in FIG. 19(*b*). The alternative case of $$a < 0 < b \quad (24)$$

corresponds to the SBE being the lower edge of the respective transmission band. There is no qualitative difference between the two cases.

At any given frequency ν within the range $$\nu_a < \nu < \nu_b. \quad (25)$$

there are two pairs (9) and (10) of reciprocal Bloch waves. Each pair comprises one forward and one backward propagating modes with equal and opposite wave numbers and group velocities $$\pm\kappa_A = \pm\kappa_B \sqrt{1 - \sqrt{1 - \frac{v}{v_b}}}, \quad (26)$$

$v_a < v < v_b.$ $$\pm\kappa_B = \pm\kappa_B \sqrt{1 + \sqrt{1 - \frac{v}{v_b}}}, \quad (27)$$

$v < v_b.$

The pair of wave numbers (26) corresponds to the concave portion of the dispersion curve (15), while the pair of wave numbers (27) corresponds to the convex portion of the dispersion curve. Obviously, $$k_A < k_B \text{ at } v_a < v < v_b. \quad (28)$$

Conditions for the Double SBE Resonance

Figure 25A:
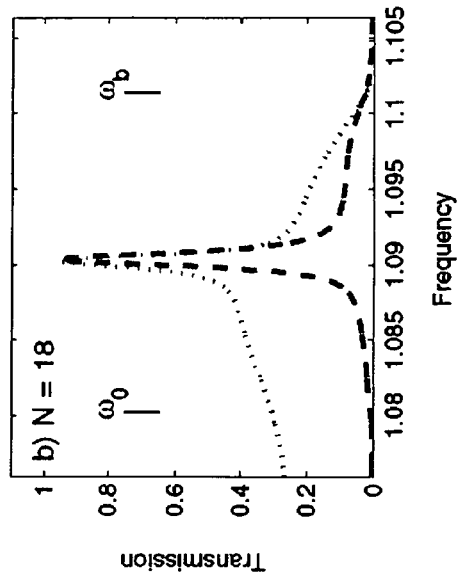
FIGS. 25(a)-(d) are graphs depicting the transmission dispersion of periodic stacks composed of different numbers N of unit cells. The frequency range shown includes SBE on the k–ω diagram in FIG. 19(b). The two curves correspond to two different polarizations of incident wave. In either case, at any given frequency ω, the incident wave polarization is adjusted so that it would excite a single propagating Bloch mode ($\psi_A$ or $\psi_B$) in the respective semi-infinite periodic structure. In the case (b) of N=18, the two resonance frequencies nearly coincide, creating condition for double transmission resonance with perfect impedance matching. The frequency ω is expressed in units of $cL^{-1}$.
Figure 25B:
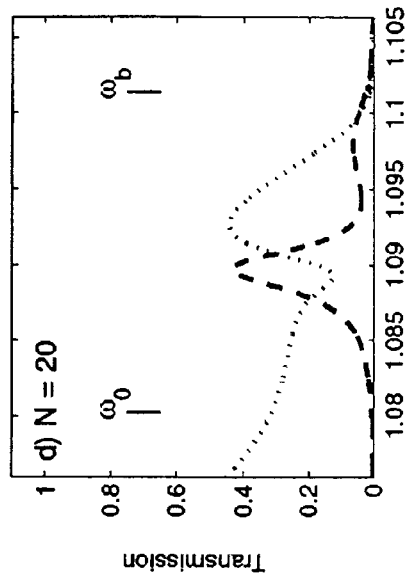
Figure 25C:
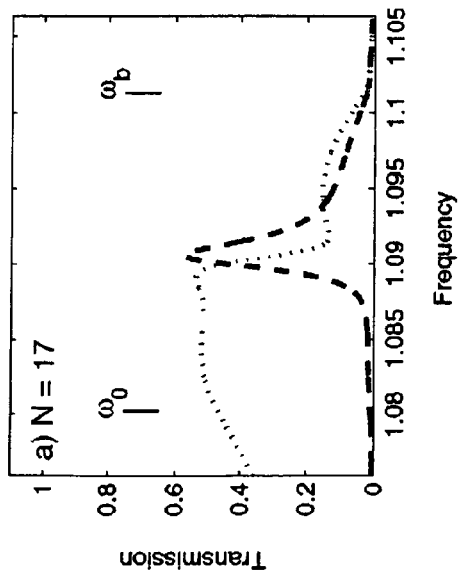
Figure 25D:
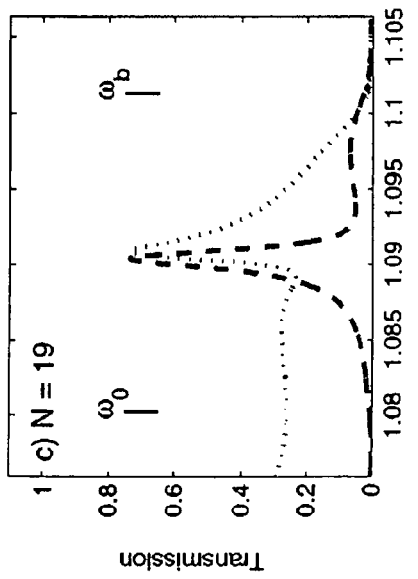

Within the frequency range (25), either pair of the reciprocal Bloch waves (9) and (10) can develop a transmission resonance. Of particular interest here is the case where the two resonances occurs at the same or almost the same frequency. This situation is illustrated in FIG. 25(c), as well as in FIGS. 23 and 24.

Starting with the resonance created by the reciprocal pair (9) of Bloch waves corresponding to the concave section of the dispersion curve in FIG. 19(b), it is possible that the frequency range (25) contains only a single cavity resonance—the one with m=1. Such a case is determined by either the proximity of the SBE to a DBE, or by the right choice of the number N of the unit cells in the stack. According to Esq. (21) and (5), the condition for a single resonance is $$\kappa_1 < \kappa_b < 2\kappa_1, \quad (29)$$

$$\kappa_A = \kappa_1 = \frac{\pi}{N}.$$

The respective resonance frequency $P_A$ is determined by Esq. (6) and (15)

$$v_A = v_1 = \frac{a}{2}\kappa_1^2 + \frac{b}{4}\kappa_1^4, \quad (30)$$

where $\kappa_1 = \pi/N$.

Consider now the resonance created by the reciprocal pair (10) of Bloch waves corresponding to the convex section of the dispersion curve. The following condition is imposed $$v_A = v_B \equiv v_r \quad (31)$$

that both resonances occur at the same frequency (30). This condition leads to the following equality:

$$\frac{a}{2}\kappa_A^2 + \frac{b}{4}\kappa_A^4 = \frac{a}{2}\kappa_B^2 + \frac{b}{4}\kappa_B^4.$$

Simple analysis shows that it is only possible if at $v=v_r$ the following is given $$\kappa_A = 2\kappa_B = 2\kappa_1 = \frac{2\pi}{N}.$$

The relation $k_A = 2k_B$ together with Esq. (26) and (27) yield $$\kappa_b = \sqrt{\frac{5}{2}}\kappa_1 = \sqrt{\frac{5}{2}}\frac{\pi}{N}.$$

The frequency of the double transmission resonance is $$v_r = \left(\frac{4}{5}\right)^2. \quad (32)$$

$$v_b = \frac{2}{5}b\left(\frac{\pi}{N}\right)^2.$$

The group velocities of the two reciprocal pairs of Bloch waves at the resonance frequency $v_r$ are $$u_A = \mp\frac{3}{2}b\kappa_1^3 = \mp\frac{3}{2}b\left(\frac{\pi}{N}\right)^3$$

and $$u_B = \pm 3b\kappa_1^3 = \pm b\left(\frac{\pi}{N}\right)^3.$$

By comparison, in the case of a DBE related giant transmission band edge resonance, the following estimation is provided for the resonance frequency v1 and the respective group velocity of the two propagating Bloch components $$v_1 \propto \frac{b}{N^2}.$$

$$u_1 \propto \frac{b}{N^3}.$$

These estimations are similar to those related to the double transmission resonance associated with a SBE. In either case, the average resonance energy density is estimated by Eq. (3), which justifies the term "giant" transmission resonance.

The entire consideration of this subsection was based on the assumption that each pair (9) and (10) of the reciprocal Bloch modes is responsible for its own individual transmission resonance, described as a standing wave (9) or (10), respectively. While the double resonance at $v_r$ is described as the situation where the frequencies $v_A$ and $v_B$ of those individual resonances merely coincide. In fact, these two transmission resonances can be treated as independent only if the respective resonance frequencies $v_A$ and $v_B$ are separated. As soon as $v_A$ and $v_B$ are close to each other, the contributions of all four propagating Bloch modes to the resonance field $\Psi_T(z)$ in Eq. (8) become equally important. The latter situation persists even if the incident wave polarization correspond to the, so-called, single mode excitation regime, defined in Refs. [23,33] for the case of a semi-infinite periodic structure. In other words, the single mode excitation regime produces almost pure $\Psi_A(z)$ resonance (9) or $\Psi_B(z)$ resonance (10) only if their frequencies are well separated. Otherwise, the EM field $\Psi_B(z)$ is a superposition of all four Bloch eigenmodes. In such a case, the resonance field $\Psi_T(z)$ cannot be viewed as a simple standing wave (4) regardless of the incident wave polarization. The physical reason for such a strong hybridization is that due to the condition (22), the RBE in question is very close to a DBE. On the other hand, in the vicinity of a DBE, all four vector columns $\Psi_k(z)$ in Eq. (A4) become nearly parallel to each other [23,33]. The latter circumstance excludes the possibility of exciting only one of the two pairs of the reciprocal Bloch modes (9) or (10) in the situation (31), where the resonance conditions (5) are in place for both of them simultaneously. Still, the above consideration provides a very useful guidance on the conditions for SBE related giant transmission resonance and allows to find the proper physical characteristics of the periodic structure.

The bottom line is that the SBE related giant transmission resonance is as powerful as that related to a DBE. However, in addition, the SBE related resonance provides a perfect coupling with the incident wave regardless of its polarization.

In summary, it is stressed that the remarkable features of the DBE and SBE related giant transmission resonances can be derived from such fundamental characteristics of the periodic composite medium as its electromagnetic dispersion relation. Specific details of the periodic array, such as physical characteristics of the constitutive components, or structural geometry, are only important as long as the symmetry of the periodic array is compatible with the existence of the required spectral singularities.

Electrodynamics of Stacks of Birefringent Layers

This section briefly introduces some basic notations and definitions of electrodynamics of stratified media involving birefringent layers. A detailed and consistent description of the subject, along with numerous references, can be found in Refs. [18,19,23,33], where similar notations and terminology are used. For simplicity, the discussion herein is restricted to the case of a plane monochromatic wave normally incident on a layered structure, as shown in FIG. 17. The results can be easily generalized to the case of oblique incidence, as was done, for example, in Refs. [19,23].

Time-harmonic electromagnetic field inside and outside the layered medium can be described by the vector column $$\Psi(z) = \begin{bmatrix} E_x(z) \\ E_y(z) \\ H_x(z) \\ H_y(z) \end{bmatrix}. \tag{A1}$$

where $\vec{E}(z)$ and $\vec{H}(z)$ are time-harmonic electric and magnetic fields. The z direction is normal to the layers. The values of $\Psi$ at any two locations z and z' are related by the transfer matrix $T(z,z')$ defined by $$\Psi(z)=T(z,z')\Psi(z'). \tag{A2}$$

The elements of the transfer matrix are expressed in terms of material tensors and other physical characteristics of the stratified medium.

Let $\Psi_I$, $\Psi_R$, and $\Psi_P$ be the incident, reflected, and transmitted waves, respectively, as shown in FIG. 17. To the left of the stack (at z<0), the electromagnetic field is a superposition of the incident and reflected waves. To the right of the stack (at z<D), there is only the transmitted wave. The field inside the periodic medium is denoted as $\Psi_T$. All four trans-verse field components in Eq. (A1) are continuous functions of z, which produces the following boundary conditions at z=0 and z=D in FIG. 17:

$$\Psi_I(0)+\Psi_R(0)=\Psi_T(0),\ \Psi_P(D)=\Psi_T(D). \tag{A3}$$

Inside the periodic stratified medium, at any given frequency ω, the time-harmonic field $\Psi_T(z)$ can be represented as a superposition $$\Psi_T(z)=\Psi_{k1}(z)+\Psi_{k2}(z)+\Psi_{k3}(z)+\Psi_{k4}(z).\ 0<z<D \tag{A4}$$

of four Bloch eigenmodes, each of which satisfies the following relation:

$$\Psi_k(z+L)=e^{ikL}\Psi_k(z). \tag{A5}$$

Real k correspond to propagating (traveling) Bloch modes, while complex k correspond to evanescent modes. Depending on the frequency ω, the full set of four Bloch eigenmodes in Eq. (A4) may include only propagating modes, only evanescent modes, or both. In any event, the respective set $[k_1, k_2, k_3, k_4]$ of four Bloch wave numbers satisfies the relation:

$$[k_1,k_2,k_3,k_4]=[k^*_1,k^*_2,k^*_3,k^*_4]. \tag{A6}'$$

Taking into account Eq. (A6), one can distinguish the following three possibilities.

(i) All four Bloch modes in Eq. (A4) are propagating $$k_1=k^*_1,\ k_2=k^*_2,\ k_3=k^*_3,\ k_4=k^*_4. \tag{A7}$$

(ii) All four Bloch modes in Eq. (A4) are evanescent. This is the case when the frequency w falls into a photonic band gap. According to Eq. (A6), one can assume that in this case $$k_1=k^*_2\ne k^*_1,\ k_3=k^*_4\ne k^*_3. \tag{A8}$$

(iii) Two of the Bloch modes in Eq. (A4) are propagating modes, while the other two are evanescent. According to Eq. (A6), one can assume that in this case $$k_1=k^*_1,\ k_2=k^*_2,\ k_3=k^*_4\ne k^*_3. \tag{A9}$$

In all cases, propagating modes with u>0 and evanescent modes with k">0 are referred to as forward waves. The propagating modes with u<0 and evanescent modes with k"<0 are referred to as backward waves.

In reciprocal (nonmagnetic) periodic structures, the Bloch dispersion relation ω(k) is always symmetric with respect to the points k=0 and k=π/L of the Brillouin zone $$\omega(k_0+k)=\omega(k_0-k).\ \text{where } k_0=0.\ \pi/L. \tag{A10}$$

In periodic structures composed of nonbirefringent layers, every Bloch wave is doubly degenerate with respect to polarization. A typical k–ω diagram for such a case is shown in FIG. 18(a). If, on the other hand, some of the layers display an in-plane anisotropy or gyrotropy, the polarization degeneracy can be lifted. The respective k–ω diagrams are shown in FIG. 19.

The speed of a traveling wave in a periodic medium is determined by the group velocity u=∂ω/∂k. Normally, every spectral branch ω(k) develops stationary points (1), where the group velocity of the corresponding propagating mode vanishes. Usually, such points are located at the center and at the boundary of the Brillouin zone $$k_s=k_0=0,\ \pi/L. \tag{A11}$$

This is always the case in periodic layered structures composed of nonbirefringent layers, where all stationary points coincide with photonic band edges, as shown in FIG. 18(a). If, on the other hand, some of the layers in a unit cell are birefringent, then in addition to Eq. (A11), some dispersion curves can also develop a reciprocal pair of stationary points corresponding to a general value of the Bloch wave number k, as shown in FIG. 19(b). The respective portion of the k–ω diagram can be described as a split band edge (SBE). The dispersion relation can develop a DBE or a SBE only if the periodic layered array has birefringent layers with misaligned in-plane anisotropy [23,33]. An example of such a layered structure is shown in FIG. 22.

Under normal circumstances, evanescent modes decay exponentially with the distance from the periodic structure boundaries. In such cases, the evanescent contribution to $\Psi_T$ can be significant only in close proximity to the surface or some other defects of the periodic structure. The situation can change dramatically in the vicinity of a stationary point (1). At first sight, stationary points (1) relate only to propagating Bloch modes. But in fact, in the vicinity of every stationary point frequency $\omega_s$, the imaginary part k″ of the Bloch wavenumber of at least one of the evanescent modes also vanishes. As a consequence, the respective evanescent mode decays very slowly, and its role may extend far beyond the photonic crystal boundary.

The final and most important remark is related to the EM eigenmodes in the vicinity of a DBE or such a RBE that is close in shape to a DBE. In either case, all four vector-columns (A1) corresponding to the four Bloch modes in Eq. (A4) are nearly parallel to each other (see the details in Refs. [22,23,33]). The latter circumstance is responsible for the giant EM field amplitude at the respective transmission resonance.

Energy Flux: Transmission and Reflection Coefficients

Let $S_I$, $S_R$, $S_T$, and $S_P$ be the energy fluxes of the respective waves in FIG. 17. The transmission and reflection coefficients t and r are defined as $$t = \frac{S_P}{S_I}.$$

$$r = -\frac{S_R}{S_I}.$$

(A12)

In the case of losses medium, the Poynting vector S is independent of z $$S \equiv S_I + S_R = S_T = S_P.$$

In such a case $t = 1 - r = S/S_I$.

In the general case of the time-harmonic EM field $\Psi_T(z)$ being a superposition (A4) of several Bloch modes, propagating and/or evanescent, the contribution of each propagating mode $\Psi_k$ to the total energy flux S is independent of others and can be expressed in terms of its group velocity and amplitude $$S_k = W_k u_k, \text{ where } W_k \propto <|\Psi_k|^2>.$$

(A13)

In the particular case of a single propagating mode, the quantity $W_k$ in Eq. (A13) is equal to the energy density averaged over a unit cell L. By contrast, a single evanescent mode never transfers energy. Only a combination of forward and backward evanescent modes can contribute to the energy flux (see p. 327 in Ref. [22]).

Energy Density and Energy Flux at Resonance Frequency

Consider the energy flux at transmission band edge resonance formed by a pair (A15) of reciprocal Bloch waves. Assume that the amplitude of the incident wave in FIG. 17 is unity and the transmission coefficient t in Eq. (A12) at resonance frequency is also of the order of unity. The boundary conditions (A3) together with Eq. (4) yield $$\Psi_T(0) = \Psi_k(0) + \Psi_{-k}(0) \propto 1.$$

$$\Psi_T(D) = \Psi_k(D) + \Psi_{-k}(D) \propto 1.$$

(A14)

According to Eq. (A13), the energy flux associated with the time-harmonic field $\Psi_T(z)$ in Eq. (4) is $$S = S_k + S_{-k} \approx W_k u(k) + W_{-k} u(-k) = (W_k - W_{-k}) u(k).$$

(A15)

where $$W_k \propto <|\Psi_k|^2>, W_{-k} \propto <|\Psi_{-k}|^2>.$$

The conditions the finite resonance transmission is compatible with the vanishing group velocity in the vicinity of stationary point (1), where the transmission band edge resonance occurs is considered. In the vicinity of stationary point (1), the magnitude u(k) of the group velocity in Eq. (A15) is vanishingly small. The fact that the resonance energy flux remains of the order of unity implies that the amplitude of the Bloch components in Eq. (A15) increases so that $$W_k - W_{-k} \propto u^{-1}. \text{ as } u \to 0.$$

(A16)

In order to reconcile the boundary condition (A14) with the requirement (A16) of a finite energy flux, the following requirement on the amplitudes of the two Bloch components is imposed $$W_k - W_{-k} \propto \sqrt{W_k} \propto u^{-1}. \text{ as } u \to 0.$$

(A17)

The relation (A17) was derived under the assumption that the time-harmonic filed $\Psi_T(z)$ inside the periodic medium is a superposition (4) of one forward and one backward propagating Bloch waves with equal and opposite wave numbers and group velocities. This is always the case for RBE related transmission resonance. However, the representation (4) is not applicable to the case of a DBE related giant resonance, because in this case the contribution of the evanescent modes is equally important [33]. Finally, in the case of SBE related transmission resonance, the relations (4) and (A17) may or may not apply, depending on whether the resonance field $\Psi_T(z)$ is formed by a single pair of propagating Bloch modes, or the contribution of all four propagating modes is equally important.

Physical Characteristics of the Periodic Layered Structure Used in Numerical Simulations The simplest periodic layered structure supporting a DBE or a SBE at normal propagation is shown in FIG. 22. A unit cell L contains one isotropic B layer and two misaligned anisotropic layers $A_1$ and $A_2$ with inplane anisotropy. The isotropic layers have the thickness B and the dielectric permittivity $$\hat{\varepsilon}_B = \begin{bmatrix} \varepsilon_B & 0 & 0 \\ 0 & \varepsilon_B & 0 \\ 0 & 0 & \varepsilon_B \end{bmatrix}.$$

(B1)

The dielectric permittivity tensors $\hat{\varepsilon}_A$ in each anisotropic A layer has the form $$\hat{\varepsilon}_A(\varphi) = \begin{bmatrix} \varepsilon_A + \delta\cos2\varphi & \delta\sin2\varphi & 0 \\ \delta\sin2\varphi & \varepsilon_A - \delta\cos2\varphi & 0 \\ 0 & 0 & \varepsilon_3 \end{bmatrix},$$

(B2)

where the parameter δ characterizes the magnitude of inplane anisotropy, and the angle φ determines the orientation of the anisotropy axes in the x-y plane. All the A layers have the same thickness A and the same magnitude δ of inplane anisotropy. The only difference between the adjacent anisotropic layers $A_1$ and $A_2$ in FIG. 22 is their orientation. An important characteristic of the periodic structure in FIG. 22 is the misalignment angle $$\varphi = \varphi_1 - \varphi_2 \qquad (B3)$$

between the layers $A_1$ and $A_2$. This angle determines the symmetry of the periodic array and, eventually, the kind of k–ω diagram it can display.

In all numerical simulations related to the periodic layered structure in FIG. 22 the following values of the material parameters are used in Esq. (B1)-(B3)

$$\epsilon_B = 16.0, \epsilon_A = 4.7797. \delta = 3.4572. \varphi = \pi/6. \qquad (B4)$$

At normal propagation, the numerical value of $\epsilon_3$ in Eq. (B2) is irrelevant. The relative thickness of the A and B layers, can be different in different examples.

In all plots of the field distribution inside periodic media at 0<z<D we, in fact, plotted the following physical quantity:

$$\propto |\Psi(z)|^2 \Rightarrow \propto \vec{E}(z) \cdot \vec{E}^*(z) + \vec{H}(z) \cdot \vec{H}^*(z) >_L. \qquad (B5)$$

which is the squared field amplitude averaged over a local unit cell. The actual function $|\Psi(z)|^2$, as well as the electromagnetic energy density distribution W(z), are strongly oscillating functions of the coordinate z, with the period of oscillations coinciding with the unit cell length L. Given the relation Wα|Ψ(z)|², the quantity (B5) can also be qualitatively interpreted as the smoothed energy density distribution, with the correction coefficient of the order of unity. In all plots, the distance z, the wavenumber k, and the frequency ω are expressed in units of L, $L^{-1}$, and $cL^{-1}$, respectively.

REFERENCES

[1] A. Figotin, I. Vitebskiy. *Photonic devices having degenerate spectral band edges and methods for using the same*. US Patent Application. Filed Jan. 31, 2006.

[2] A. Figotin, and I. Vitebsky. *Nonreciprocal magnetic photonic crystals*. Phys. Rev. E63, 066609 (2001).

[3] A. Figotin, and I. Vitebskiy. *Electromagnetic unidirectionality in magnetic photonic crystals*. Phys. Rev. B67, 165210 (2003).

[4] A. Figotin, and I. Vitebskiy. *Oblique frozen modes in layered media*. Phys. Rev. E68, 036609 (2003).

[5] J. Ballato, A. Ballato, A. Figotin, and I. Vitebskiy. *Frozen light in periodic stacks of anisotropic layers*. Phys. Rev. E71, (2005).

[6] A. Figotin and I. Vitebskiy. *Electromagnetic unidirectionality and frozen modes in magnetic photonic crystals*. JMMM, 300, 117 (2006).

[7] A. Figotin and I. Vitebskiy. *Slow light in photonic crystals (Topical Review)*. Waves in Random Media, Vol. 16, No. 3, 293-382 (2006).

[8] A. Figotin and I. Vitebskiy. *Gigantic transmission bandedge resonance in periodic stacks of anisotropic layers*. Phys. Rev. E72, 036619, (2005).

[9] A. Figotin and I. Vitebskiy. *Frozen light in photonic crystals with degenerate band edge*. Phys. Rev. E 74, 066613 (2006).

[11] L. Brillouin, Wave Propagation and Group Velocity (Academic, New York, 1960).

[12] L. D. Landau, E. M Lifshitz, and L. P. Pitaevskii, Electrodynamics of Continuous Media (Pergamon, New York, 1984).

[13] J. Joannopoulos, R. Meade, and J. Winn, Photonic Crystals (Princeton University Press, Princeton, 1995).

[14] A. Yariv and Pochi Yeh, Optical Waves in Crystals (Wiley-Interscience, New York, 1984).

[15] Pochi Yeh, Optical Waves in Layered Media (Wiley, New York, 1988).

[16] Weng Cho Chew, Waves and Fields in Inhomogeneous Media (Van Nostrand Reinhold, New York, 1990).

[17] M. Notomi, Phys. Rev. B 62, 10696 (2000).

[18] A. Figotin and I. Vitebskiy, Phys. Rev. B 67, 165210 (2003).

[19] A. Figotin and I. Vitebskiy, Phys. Rev. E 68, 036609 (2003).

[20] J. Ballato, A. Ballato, A. Figotin, and I. Vitebskiy, Phys. Rev. E 71, 036612 (2005).

[21] A. Figotin and I. Vitebskiy, J. Magn. Magn. Mater. 300, 117 (2006).

[22] A. Figotin and I. Vitebskiy, Waves Random Media 16, 293 (2006).

[23] A. Figotin and I. Vitebskiy, Phys. Rev. E 74, 066613 (2006).

[24] A. Figotin and V. Gorentsveig, Phys. Rev. B 58, 180 (1998).

[25] A. Vinogradov, A. Dorofeenko, S. Erokhin, M. Inoue, A. Lisyansky, A. Merzlikin, and A. Granovsky, Phys. Rev. B 74, 045128 (2006).

[26] M. Selim Unlu and S. Strite, J. AppL. Phys. 78, 607 (1995).

[27] J. Dowling, M. Scalora, M. Bloemer, and Ch. Bowden, J. Appl. Phys. 75, 1896 (1994).

[28] M. Scalora, J. Flynn, S. B. Reinhardt, R. L. Fork, M. J. Bloemer, M. D. Tocci, C. M. Bowden, H. S. Ledbetter, J. M. Bendickson, J. P. Dowling, and R. P. Leavitt, Phys. Rev. E 54, R1078 (1996).

[29] M. Bloemer, Myneni, M. Centini, M. Scalora, and G. D'Aguanno, Phys. Rev. E 65, 056615 (2002).

[30] M. Soljacic, S. Johnson, S. Fan, M. Ibanescu, E. Ippen, and J. D. Joannopoulos, J. Opt. Soc. Am. B 19, 2052 (2002).

[31] J. Poon, J. Scheuer, Y. Xu, and A. Yariv, J. Opt. Soc. Am. B 21, 1665 (2004).

[32] S. Yarga, G. Mumcu, K. Sertel, and J. Volakis (unpublished).

[33] A. Figotin and I. Vitebskiy, Phys. Rev. E 72, 036619 (2005).

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A photonic device, comprising:
a periodic structure having a plurality of periodic segments, wherein individual periodic segments comprise at least two anisotropic layers with misaligned anisotropy, the periodic structure having an electromagnetic dispersion relation that exhibits a frequency gap with a split band edge for an input electromagnetic wave propagation in a first direction, wherein the structure is periodic in the first direction and wherein 100% of the incident electromagnetic radiation of the input electromagnetic wave propagates in the first direction regardless of a polarization of the incident electromagnetic radiation.

2. The photonic device of claim 1, wherein the structure is configured as an electromagnetic waveguide.

3. The photonic device of claim 2, wherein the structure is a fiber configured to operate over a frequency range in an optical portion of an electromagnetic spectrum.

4. The photonic device of claim 2, wherein the waveguide comprises the plurality of periodic segments and wherein the first direction is a Z direction and each segment has a variable cross-sectional shape measured along an X-Y plane formed by an X direction and a Y direction, the X direction being perpendicular to the Z direction and the Y direction being perpendicular to the X and Z directions.

5. The photonic device of claim 4, wherein the cross-sectional shape of at least a portion of each segment is anisotropic in the X-Y plane.

6. The photonic device of claim 2, wherein the waveguide comprises the plurality of periodic segments and wherein each of the segments comprises a first portion and a second portion located successively along the first direction, the first portion comprising a first non-uniform material and the second portion comprising a second non-uniform material, wherein the first portion has an anisotropy in the X-Y plane misaligned from an anisotropy of the second portion.

7. The photonic device of claim 6, wherein each of the segments comprises a third isotropic portion in the X-Y plane.

8. The photonic device of claim 1, wherein the structure is a photonic band gap material.

9. The photonic device of claim 1, wherein the structure comprises the plurality of segments located successively along the first direction, each of the segments comprising a first anisotropic layer having a first anisotropic axis and a second anisotropic layer having a second anisotropic axis, the first anisotropic axis having an alignment different from the second anisotropic axis, wherein the first and second layers are located successively along the first direction.

10. The photonic device of claim 9, wherein each of the segments comprises a third isotropic layer located successively along the first direction.

11. The photonic device of claim 1, wherein the structure is periodic in a second direction perpendicular to the first direction.

12. The photonic device of claim 11, wherein the structure is periodic in a third direction perpendicular to the first and second directions.

13. The photonic device of claim 1, wherein the structure is configured to convert the input electromagnetic wave into a frozen mode when the electromagnetic wave operates at a frequency in proximity with the split band edge.

14. The photonic device of claim 13, wherein the frozen mode is characterized by a group velocity lower than that of the input wave and an amplitude higher than that of the input electromagnetic wave and the frozen mode is coherent in both time and space.

15. The photonic device of claim 1, wherein the photonic device is configured to support propagation of an abnormal surface wave at one or more frequencies close to the split band edge.

16. The photonic device of claim 1, wherein the structure is configured as a resonance cavity configured to operate at a transmission band edge resonance frequency substantially close to the split band edge.

17. The photonic device of claim 16, wherein the resonance cavity is configured to operate at a transmission band edge resonance frequency substantially closest to the split band edge.

18. The photonic device of claim 1, wherein the electromagnetic wave is a pulse.

19. A photonic system, comprising:
a photonic device configured to display a split band edge, the photonic device comprising a first end, a second end, a first surface located on the first end and a plurality of segments coupled together between the first and second ends, each segment comprising:
a first anisotropic layer;
a second anisotropic layer misaligned with the first anisotropic layer; and
a third layer, wherein the photonic device is configured to convert 100% of the electromagnetic radiation of an input electromagnetic wave incident on the first surface into a frozen mode when the electromagnetic wave operates at a frequency in proximity with the split band edge regardless of a polarization of the incident electromagnetic radiation.

20. The photonic system of claim 19, wherein the frozen mode is characterized by a group velocity lower than that of the incident wave and an amplitude higher than that of the incident wave and the frozen mode is coherent in both time and space.

21. The photonic system of claim 19, wherein each layer of each segment is substantially lossless and/or substantially transparent to electromagnetic waves at a desired frequency range.

22. The photonic device of claim 19, wherein each segment has a length that is the same order of magnitude as a wavelength of the incident electromagnetic wave.

23. The photonic system of claim 19, wherein the photonic device is configured as a resonance cavity configured to operate at a transmission band edge resonance frequency substantially closest to the split band edge.

24. The photonic system of claim 19, wherein the photonic device is configured to support propagation of an abnormal surface wave at frequencies close to the split band edge.

25. A photonic system, comprising:
a photonic device configured to display a split band edge, the photonic device comprising a first end, a second end, a first surface located on the first end and a plurality of periodic segments coupled together between the first and second ends, each segment comprising:
a first anisotropic layer having a first thickness; and
a second anisotropic layer misaligned with the first anisotropic layer and having a second thickness different from the first thickness;
wherein the photonic device is configured to convert 100% of the electromagnetic radiation of an input electromagnetic wave incident on the first surface into a frozen mode when the electromagnetic wave operates at a frequency in proximity with the split band edge regardless of a polarization of the electromagnetic radiation.

26. The photonic system of claim 25, wherein the frozen mode is characterized by a group velocity lower than that of the incident wave and an amplitude higher than that of the incident wave and the frozen mode is coherent in both time and space.

27. The photonic system of claim 25, wherein each layer of each segment is substantially lossless and/or substantially transparent to electromagnetic waves at a desired frequency range.

28. The photonic device of claim 25, wherein each segment has a length that is the same order of magnitude as a wavelength of the incident electromagnetic wave.

29. The photonic system of claim 25, wherein the photonic device is configured as a resonance cavity configured to operate at a transmission band edge resonance frequency substantially closest to the split band edge.

30. The photonic system of claim 25, wherein the photonic device is configured to support propagation of an abnormal surface wave at frequencies close to the split band edge.

* * * * *